(12) United States Patent
Ueda et al.

(10) Patent No.: US 11,969,969 B2
(45) Date of Patent: Apr. 30, 2024

(54) METAL-CARBON FIBER REINFORCED RESIN MATERIAL COMPOSITE AND METHOD FOR MANUFACTURING METAL-CARBON FIBER REINFORCED RESIN MATERIAL COMPOSITE

(71) Applicant: NIPPON STEEL CORPORATION, Tokyo (JP)

(72) Inventors: Kohei Ueda, Tokyo (JP); Yasuaki Kawamura, Tokyo (JP); Masumi Koori, Tokyo (JP); Masaharu Ibaragi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 174 days.

(21) Appl. No.: 17/599,914

(22) PCT Filed: Apr. 2, 2019

(86) PCT No.: PCT/JP2019/014607
§ 371 (c)(1),
(2) Date: Sep. 29, 2021

(87) PCT Pub. No.: WO2020/202461
PCT Pub. Date: Oct. 8, 2020

(65) Prior Publication Data
US 2022/0161521 A1 May 26, 2022

(51) Int. Cl.
*B32B 15/14* (2006.01)
*B32B 15/08* (2006.01)
(Continued)

(52) U.S. Cl.
CPC ............. *B32B 15/14* (2013.01); *B32B 15/08* (2013.01); *C08J 5/121* (2013.01); *C08J 5/243* (2021.05);
(Continued)

(58) Field of Classification Search
None
See application file for complete search history.

(56) References Cited

U.S. PATENT DOCUMENTS

| | | | |
|---|---|---|---|
| 2013/0161062 A1* | 6/2013 | Yamaoka | C23C 26/00 174/110 SR |
| 2015/0030864 A1* | 1/2015 | Takeuchi | B29C 65/02 428/458 |

(Continued)

FOREIGN PATENT DOCUMENTS

| | | |
|---|---|---|
| EP | 3 808 557 A1 | 4/2021 |
| JP | 2006-137143 A | 6/2006 |

(Continued)

*Primary Examiner* — Seth Dumbris
(74) *Attorney, Agent, or Firm* — Birch, Stewart, Kolasch & Birch, LLP

(57) ABSTRACT

What is provided is a new and improved metal-carbon fiber reinforced resin material composite in which the galvanic corrosion of dissimilar materials of a metal member is suppressed and electrodeposition coatability is excellent and a method for manufacturing the metal-carbon fiber reinforced resin material composite. A metal-carbon fiber reinforced resin material composite according to the present invention has a metal member, a resin coating layer disposed on at least a part of a surface of the metal member, and a carbon fiber reinforced resin material containing a matrix resin and a carbon fiber material present in the matrix resin, the resin coating layer contains any one or more kinds selected from the group consisting of metal particles, intermetallic compound particles, conductive oxide particles, and conductive non-oxide ceramic particles as conductive particles and further contains a binder resin, and the conductive particles have a powder resistivity at 23° C. to 27° C. of $7.0 \times 10^7$ Ω·cm or less and contain one or more selected from the group consisting of Zn, Si, Zr, V, Cr, Mo, Mn, and W.

17 Claims, 6 Drawing Sheets

(51) Int. Cl.
*C08J 5/12* (2006.01)
*C08J 5/24* (2006.01)
*C23C 2/26* (2006.01)

(52) U.S. Cl.
CPC ............. *C08J 5/249* (2021.05); *C23C 2/26* (2013.01); *B32B 2255/06* (2013.01); *B32B 2255/26* (2013.01); *B32B 2260/021* (2013.01); *B32B 2260/046* (2013.01); *B32B 2262/106* (2013.01); *B32B 2264/102* (2013.01); *B32B 2307/202* (2013.01); *C08J 2371/10* (2013.01)

(56) References Cited

U.S. PATENT DOCUMENTS

| | | | |
|---|---|---|---|
| 2016/0333232 A1* | 11/2016 | Choi | C09J 7/26 |
| 2016/0369407 A1* | 12/2016 | Dudon | C23C 24/00 |
| 2017/0234342 A1 | 8/2017 | Ayuzawa et al. | |
| 2018/0266463 A1 | 9/2018 | Mori et al. | |

FOREIGN PATENT DOCUMENTS

| | | |
|---|---|---|
| JP | 2014-162848 A | 9/2014 |
| WO | WO 2012/029988 A1 | 3/2012 |
| WO | WO 2014/054572 A1 | 4/2014 |
| WO | WO 2016/021259 A1 | 2/2016 |
| WO | WO 2016/117062 A1 | 7/2016 |

* cited by examiner

METAL-CARBON FIBER REINFORCED RESIN MATERIAL COMPOSITE AND METHOD FOR MANUFACTURING METAL-CARBON FIBER REINFORCED RESIN MATERIAL COMPOSITE

TECHNICAL FIELD

The present invention relates to a metal-carbon fiber reinforced resin material composite and a method for manufacturing a metal-carbon fiber reinforced resin material composite.

BACKGROUND ART

Fiber reinforced plastics (FRPs), which are a composite material containing a reinforcing fiber (for example, a glass fiber, a carbon fiber, or the like) in a matrix resin, are lightweight and excellent in terms of tensile strength, processability, and the like. Therefore, FRPs are being widely used from commercial fields to industrial uses. Even in the automobile industry, in order to satisfy a need for weight reduction of vehicle bodies, which leads to improvement in fuel efficiency and other performance, studies are underway to apply FRPs to automobile members with attention paid to the low weight, tensile strength, processability, and the like of FRPs.

In particular, carbon fiber reinforced plastics (CFRPs) in which a carbon fiber is used as a reinforcing fiber are, due to the strength of the carbon fiber, particularly lightweight and particularly excellent in terms of the tensile strength and are thus a prominent material for a variety of uses such as automobile members.

Meanwhile, the matrix resin of CFRPs is normally a thermosetting resin such as an epoxy resin and is thus brittle, which makes CFRPs susceptible to brittle fracture in the event of deformation. In addition, since CFRPs for which a thermosetting resin is used as the matrix resin do not plastically deform, it is not possible to bend CFRPs once CFRPs are cured. Furthermore, CFRPs are normally expensive and cause an increase in the costs of a variety of members such as automobile members.

In order to solve these problems while maintaining the above-described advantages of CFRPs, recently, metal-CFRP composite materials in which a metal member and a CFRP are laminated and integrated (composited) together have been under studies. Since metal members are ductile, when a CFRP is composited with a metal member, the brittleness deteriorates, which makes it possible to deform and process the composite material. Furthermore, compositing an inexpensive metal member and a CFRP enables the amount of the CFRP used to be decreased and thus enables the costs of automobile members to be reduced.

Incidentally, the carbon fiber in CFRPs is a favorable conductor. Therefore, there is a likelihood that the metal member in contact with the CFRP may become electrically conductive and thus a phenomenon in which the metal member corrodes due to an electrolytic corrosion action (galvanic corrosion of dissimilar materials) may occur. Several proposals have been made in order to prevent such galvanic corrosion of dissimilar materials.

Patent Document 1 proposes a carbon fiber reinforced resin formed article in which a particulate or oil-form silicone compound is dispersed in a matrix resin of the carbon fiber reinforced resin formed article and which is used in a state of being in contact with a metal component. Patent Document 2 proposes a fiber reinforced resin member in which a non-conductive sheet such as a non-conductive sleeve or a glass fiber reinforced resin is disposed between a metal fastening member and a CFRP laminated sheet. Patent Document 3 proposes a fastening structure of a carbon fiber reinforced resin material in which the carbon fiber reinforced resin material and an abutting portion of a metal collar are attached to each other through an insulating adhesive.

Patent Document 4 discloses a conductive and corrosion-resistant painted metal sheet in which a covering ($\alpha$) containing an organic resin (A) and non-oxide ceramic particles (B), which have an electrical resistivity at 25° C. of $0.1 \times 10^{-6}$ to $185 \times 10^{-6}$ $\Omega \cdot cm$ and are selected from a boride, a carbide, a nitride, and a silicide, is formed on at least one surface of the metal sheet, the volume ratio at 25° C. between the organic resin (A) and the non-oxide ceramic particles (B) in the covering (a) is 90:10 to 99.9:0.1, and the organic resin (A) contains a resin (A1) containing at least one functional group selected from a carboxyl group and a sulfonic acid group in the structure or contains the resin (A1) and, furthermore, a derivative (A2) of the resin (A1).

CITATION LIST

[Patent Document]
[Patent Document 1]
  Japanese Unexamined Patent Application, First Publication No. 2014-162848
[Patent Document 2]
  PCT International Publication No. WO 2016/021259
[Patent Document 3]
  PCT International Publication No. WO 2016/117062
[Patent Document 4]
  PCT International Publication No. WO 2012/029988

SUMMARY OF THE INVENTION

Problems to be Solved by the Invention

Incidentally, depending on uses, electrodeposition coating is carried out on metal-CFRP composite materials. Therefore, in the case of using metal-CFRP composite materials in such uses, the metal-CFRP composite materials are also required to have excellent electrodeposition coatability. In a case where electrodeposition coating is also carried out on a CFRP, there is a need to make the CFRP and a metal member electrically conductive to each other appropriately. However, in a case where the CFRP and the metal member are electrically conductive to each other, it has not been possible to suppress the above-described galvanic corrosion of dissimilar materials.

Meanwhile, in the techniques described in Patent Documents 2 and 3, since the CFRP and the metal member are blocked by an insulating body, it is difficult to apply electrodeposition coating. In addition, the formed article described in Patent Document 1 is not a formed article in which the electric conduction between a carbon fiber and a metal component is prevented, but a formed article in which the surface of the carbon fiber reinforced resin formed article is made water-repellent with silicone. Therefore, it is difficult to suppress galvanic corrosion of dissimilar materials.

Here, as a result of studies, the present inventors found that, when electrodeposition coating is carried out on a composite material in which a CFRP is directly stuck to a metal member, not only the surface of the metal member but also the CFRP surface are coated with electrodeposition-coated coating. However, it was also found that, in composites obtained by carrying out only electrodeposition coating on a composite material in which a CFRP is directly stuck to a metal member, it is not possible to completely suppress corrosion from the contact portion between the metal member and the CFRP. Even when a resin coating, which is an insulating substance, is provided in order to suppress galvanic corrosion of dissimilar materials between the metal member and a carbon fiber in the CFRP, at the time of sticking the CFRP to the metal sheet, it is usual to thermally compress the CFRP to the metal sheet, and thus, in this step, the carbon fiber in the CFRP penetrates through the resin insulation coating and comes into contact with the metal, which has made it difficult to completely suppress galvanic corrosion of dissimilar materials. Furthermore, due to the presence of the insulation coating, even when some of the carbon fiber comes into contact with the metal member, the conductive property is impaired. Therefore, even when electrodeposition coating is carried out on a composite material having this insulating coating layer, it is difficult to coat the composite material with an electrodeposition-coated coating, and there is no effect of suppressing galvanic corrosion of dissimilar materials.

In the related art, there have been no studies regarding the suppression of galvanic corrosion of dissimilar materials and the improvement of electrodeposition coatability, and there have been no known metal-CFRP composite materials having both the suppression of dissimilar contact material corrosion and the improvement of electrodeposition coatability.

Patent Document 4 discloses an invention relating to a conductive covering containing an organic resin and non-oxide ceramic particles in a metal sheet. However, when a CFRP is directly stuck to a metal sheet according to this invention, the metal sheet is coated with an electrodeposition-coated coating, but it is not possible to suppress corrosion. Even when electrodeposition coatability is imparted by simply coating a metal with a conductive coating as in the metal sheet described in Patent Document 4, water or the like, which is a cause of corrosion, intrudes from a defect portion or the like in an electrodeposition-coated coating into the interface between the coating that coats the metal sheet and the CFRP, which causes the occurrence of galvanic corrosion of dissimilar materials.

Therefore, the present invention has been made in consideration of the above-described problems and an object of the present invention is to provide a new and improved metal-carbon fiber reinforced resin material composite in which the galvanic corrosion of dissimilar materials of a metal member is suppressed and electrodeposition coatability is excellent and a method for manufacturing the metal-carbon fiber reinforced resin material composite.

Means for Solving the Problem

As a result of intensive studies for solving the above-described problems, the present inventors found that, when a resin coating layer is provided between a metal member and a carbon fiber reinforced resin material, one or a plurality of kinds of metal particles, intermetallic compound particles, conductive oxide particles, and conductive non-oxide ceramic particles are included in the resin coating layer as conductive particles, a powder resistivity at 23° C. to 27° C. is $7.0 \times 10^7$ Ω·cm or less, and one or more selected from Zn, Si, Zr, V, Cr, Mo, Mn, and W are contained as configuration elements, it is possible to improve electrodeposition coatability while suppressing the galvanic corrosion of dissimilar materials of the metal member. This is assumed to be because the addition of the conductive substance to the resin coating layer between the metal member and the carbon fiber reinforced resin material makes the metal member and the carbon fiber reinforced resin material electrically conductive to each other and makes the surfaces of the metal material and the CFRP coated with an electrodeposition-coated coating at the time of electrodeposition coating further exhibit a barrier effect against a cause of corrosion that intrudes into the composite material, and furthermore, the use of each of metals including Zn, Si, Zr, V, Cr, Mo, Mn, and W, an intermetallic compound containing Zn, Si, Zr, V, Cr, Mo, Mn, and W, or a conductive oxide or non-oxide ceramic containing each of the metals described above as the conductive particles makes these transition elements be eluted and deposited on the metal sheet or the carbon fiber surface in the CFRP to form an insulation coating between both, whereby dissimilar material contact is avoided and the corrosion resistance is enhanced.

The present invention has been made based on such a finding and the gist thereof is as described below.

(1) A metal-carbon fiber reinforced resin material composite having a metal member, a resin coating layer disposed on at least a part of a surface of the metal member, and a carbon fiber reinforced resin material that is disposed on at least a part of a surface of the resin coating layer and contains a matrix resin and a carbon fiber material present in the matrix resin, in which the resin coating layer contains one or a plurality of kinds of metal particles, intermetallic compound particles, conductive oxide particles, and conductive non-oxide ceramic particles as conductive particles and further contains a binder resin, and the conductive particles have a powder resistivity at 23° C. to 27° C. of $7.0 \times 10^7$ Ω·cm or less and contain one or more selected from the group consisting of Zn, Si, Zr, V, Cr, Mo, Mn, and W as a configuration element.

(2) The metal-carbon fiber reinforced resin material composite according to (1), in which the conductive oxide particles are doped conductive oxide particles.

(3) The metal-carbon fiber reinforced resin material composite according to (1) or (2), in which the conductive particles are one or more kinds selected from the group consisting of Al-doped zinc oxide, $ZrB_2$, $MoSi_2$, $CrB_2$, $WSi_2$, $VB_2$, ferrosilicon, and ferromanganese.

(4) The metal-carbon fiber reinforced resin material composite according to any one of (1) to (3), in which a volume rate of the conductive particles in the resin coating layer is 1.0% or more and 30.0% or less.

(5) The metal-carbon fiber reinforced resin material composite according to any one of (1) to (4), in which the average thickness of the resin coating layer is 1.0 μm or more and 200.0 μm or less.

(6) The metal-carbon fiber reinforced resin material composite according to any one of (1) to (5), in which the average particle size of the conductive particles is 50.0 μm or less.

(7) The metal-carbon fiber reinforced resin material composite according to any one of (1) to (6), in which, when the average thickness of the resin coating layer is represented by T (μm) and the average particle size of the conductive particles is represented by r (μm), a relationship of $0.5 \leq T/r \leq 300.0$ is satisfied.

(8) The metal-carbon fiber reinforced resin material composite according to any one of (1) to (7), in which a glass transition temperature of the resin coating layer is 100° C. or lower.

(9) The metal-carbon fiber reinforced resin material composite according to any one of (1) to (8), in which the binder resin is an epoxy resin or a resin containing one or more kinds selected from the group consisting of a urethane resin, an epoxy resin, a polyester resin, and a melamine resin and an epoxy resin.

(10) The metal-carbon fiber reinforced resin material composite according to any one of (1) to (9), in which the matrix resin contains a thermoplastic resin.

(11) The metal-carbon fiber reinforced resin material composite according to any one of (1) to (10), in which the matrix resin contains a phenoxy resin.

(12) The metal-carbon fiber reinforced resin material composite according to any one of (1) to (11), further having an electrodeposition-coated coating formed on one selected from the group consisting of the resin coating layer and on the carbon fiber reinforced resin material.

(13) The metal-carbon fiber reinforced resin material composite according to any one of (1) to (12), in which the metal member is steel or plated steel.

(14) A method for manufacturing a metal-carbon fiber reinforced resin material composite having a step of thermally compressing a metal member provided on at least a part of a surface of a resin coating layer containing conductive particles and a binder resin and a carbon fiber reinforced resin material through the resin coating layer, in which the carbon fiber reinforced resin material contains a matrix resin and a carbon fiber material present in the matrix resin, the conductive particles contain one or a plurality of kinds of metal particles, intermetallic compound particles, conductive oxide particles, and conductive non-oxide ceramic particles, and the conductive particles have a powder resistivity at 23° C. to 27° C. of $7.0 \times 10^7$ $\Omega \cdot cm$ or less and contain one or more selected from the group consisting of Zn, Si, Zr, V, Cr, Mo, Mn, and W as a configuration element.

(15) The method for manufacturing a metal-carbon fiber reinforced resin material composite according to (14), further having, before the step of thermal compression, a step of forming the metal member.

(16) The method for manufacturing a metal-carbon fiber reinforced resin material composite according to (14), further having, after the step of thermal compression, a step of forming a laminate in which the metal member and the carbon fiber reinforced resin material are laminated together.

(17) The method for manufacturing a metal-carbon fiber reinforced resin material composite according to any one of (14) to (16), further having a step of forming an electrodeposition-coated coating on at least one selected from the group consisting of the resin coating layer and on the carbon fiber reinforced resin material by electrodeposition coating.

Effects of the Invention

As described above, according to the present invention, it is possible to provide a metal-carbon fiber reinforced resin material composite in which the galvanic corrosion of dissimilar materials of a metal member is suppressed and electrodeposition coatability is excellent and a method for manufacturing the metal-carbon fiber reinforced resin material composite.

EMBODIMENTS FOR IMPLEMENTING THE INVENTION

Hereinafter, preferable embodiments of the present invention will be described in detail with reference to the accompanying drawings. In the present specification and the drawings, configuration elements having substantially the same function and configuration will be given the same reference symbol and will not be described again.

In addition, similar configuration elements between different embodiments will be differentiated by attaching different alphabets to the end of the same reference sign. However, in a case where there is no need to particularly differentiate each of a plurality of configuration elements and the like having substantially the same functional configuration, only the same reference sign will be attached. In addition, each drawing is appropriately enlarged or contracted in order to facilitate the description, and the drawings are not intended to show the actual sizes and ratios of individual portions.

1. Metal-Carbon Fiber Reinforced Resin Material Composite

Figure 1:
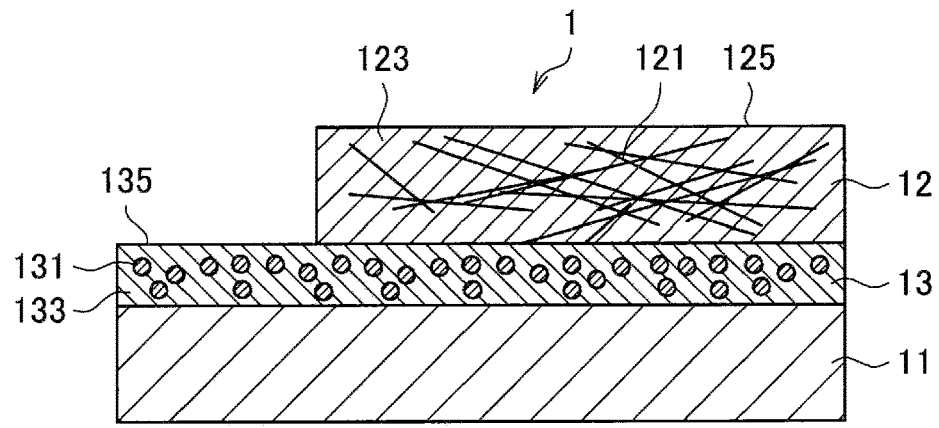
FIG. 1 is a cross-sectional schematic view of a metal-carbon fiber reinforced resin material composite according to an embodiment of the present invention in a lamination direction.

1.1. Configuration of Metal-Carbon Fiber Reinforced Resin Material Composite First, the configuration of a metal-carbon fiber reinforced resin material composite according to an embodiment of the present invention will be described with reference to FIG. 1. FIG. 1 is a schematic view showing a cross-sectional structure of a metal-carbon fiber reinforced resin material composite 1 in a lamination direction as an example of the metal-carbon fiber reinforced resin material composite according to the present embodiment.

As shown in FIG. 1, the metal-carbon fiber reinforced resin material (CFRP) composite 1 includes a metal member 11, a carbon fiber reinforced resin material (CFRP layer) 12, and a resin coating layer 13. The metal member 11 and the CFRP layer 12 are composited together through the resin coating layer 13. Here, "being composited together" means that the metal member 11 and the CFRP layer 12 are joined (stuck) to each other through the resin coating layer 13 and integrated together. In addition, "being integrated together" means that the metal member 11, the CFRP layer 12, and the resin coating layer 13 move as a unit at the time of being processed or deformed.

In addition, in the present embodiment, the resin coating layer 13 contains conductive particles 131 made of one or more selected from the group consisting of metal particles, intermetallic compound particles, conductive oxide particles, and conductive non-oxide ceramic particles, the conductive particles 131 have a powder resistivity at 23° C. to 27° C. of $7.0\times10^7$ Ω·cm or less and contain one or more selected from the group consisting of Zn, Si, Zr, V, Cr, Mo, Mn, and W as configuration elements. Therefore, in the metal-CFRP composite 1, galvanic corrosion of dissimilar materials is suppressed, and the electrodeposition coatability becomes excellent. Specifically, the conductive particles 131 contain one or more selected from the group consisting of metal particles, intermetallic compound particles, conductive oxide particles, and conductive non-oxide ceramic particles, have a powder resistivity at 23° C. to 27° C. of $7.0\times10^7$ Ω·cm or less, and contain one or more selected from the group consisting of Zn, Si, Zr, V, Cr, Mo, Mn, and W, whereby a sacrificial corrosion prevention action is developed and, furthermore, a portion in which the corresponding element is oxidized forms an oxide coating and prevents the corrosion of the metal member 11. Furthermore, the conductive particles 131 have a powder resistivity at 23° C. to 27° C. of $7.0\times10^7$ Ω·cm or less, whereby the resin coating layer 13 becomes appropriately electrically conductive, and the electrodeposition coatability improves.

Hereinafter, each configuration of the metal-CFRP composite 1 will be described in detail.

(Metal Member 11)

The material, shape, thickness, and the like of the metal member 11 are not particularly limited as long as the metal member 11 can be formed by pressing or the like, but the shape is preferably a thin sheet shape. Examples of the material of the metal member 11 include iron, titanium, aluminum, magnesium, alloys thereof, and the like. Here, examples of the alloys include iron-based alloys (including stainless steel), Ti-based alloys, Al-based alloys, Mg alloys, and the like. The material of the metal member 11 is preferably an iron and steel material, an iron-based alloy, titanium, or aluminum and more preferably an iron and steel material having a higher tensile strength than other metal types. As such an iron and steel material, examples of thin sheet-like steel sheets that are used for automobiles include iron and steel materials including cold-rolled steel sheets for general uses, drawing uses, or super deep drawing uses, processable cold-rolled high-tensile strength steel sheets for automobiles, hot-rolled steel sheets for general uses or processing uses, hot-rolled steel sheets for automobile structures, and processible hot-rolled high-tensile strength steel sheets for automobiles, which are standardized by Japanese Industrial Standards (JIS) or the like, and examples of non-thin sheet-like iron and steel materials include carbon steel, alloy steel, high-tensile strength steel, and the like that are used for general structures or for mechanical structures.

In addition, the metal member 11 is preferably an aluminum alloy since the weight of the member is reduced. The aluminum alloy is an alloy obtained by adding one or more of Si, Fe, Cu, Mn, Mg, Cr, Zn, Ti, V, Zr, Pb, and Bi to aluminum, and it is possible to use ordinarily well-known aluminum alloys, for example, 1000-series aluminum alloys, 2000-series aluminum alloys, 3000-series aluminum alloys, 4000-series aluminum alloys, 5000-series aluminum alloys, 6000-series aluminum alloys, and 7000-series aluminum alloys that are described in JIS H 4000: 2006. 5000-series aluminum alloys, 6000-series aluminum alloys, and the like having strength and formability are preferable. A magnesium alloy is an alloy obtained by adding one or more of Al, Zn, Mn, Fe, Si, Cu, Ni, Ca, Zr, Li, Pb, Ag, Cr, Sn, Y, Sb, and other rare earth elements to magnesium, and it is possible to use ordinarily well-known magnesium alloys such as AM-series magnesium alloys to which Al is added and which are described in ASTM standards, AZ-series magnesium alloys to which Al and Zn are added, and ZK-series magnesium alloys to which Zn is added. In a case where the metal member 11 has a sheet shape, these may be formed.

An arbitrary surface treatment may be carried out on the iron and steel material. Here, examples of the surface treatment include a variety of plating treatments such as zinc plating and aluminum plating, chemical conversion treatments such as a chromate treatment and a non-chromate treatment, physical surface treatments such as sand blasting, and chemical surface treatments such as chemical etching, but the surface treatment is not limited thereto. In addition, alloying of plates or a plurality of kinds of surface treatments may also be carried out. As the surface treatment, the treatment is preferably carried out for the purpose of imparting at least a rust-preventing property.

In particular, among iron and steel materials, plated steel that has undergone a plating treatment is preferable since the corrosion resistance is excellent. Examples of the plated steel that is particularly preferable as the metal member 11 include hot-dip galvanized steel sheets, zinc alloy plated steel sheets or alloyed hot-dip galvanized steel sheets obtained by thermally treating a zinc alloy plated steel sheet to diffuse Fe into a zinc plating and thereby alloy the zinc plating, electrogalvanized steel sheets, electrodeposited Zn—Ni steel sheets, hot-dip Zn—Al alloy plated steel sheets represented by hot-dip Zn-5% Al alloy plated steel sheets or hot-dip 55% Al—Zn alloy plated steel sheets, hot-dip Zn—Al—Mg alloy plated steel sheets represented by hot-dip Zn-1% to 12% Al-1% to 4% Mg alloy plated steel sheets or hot-dip 55% Al—Zn-0.1% to 3% Mg alloy plated steel sheets, Ni plated steel sheets or alloyed Ni plated steel sheets obtained by thermally treating a Ni plated steel sheet to diffuse Fe into a Ni plating and thereby alloy the Ni plating, Al plated steel sheets, tin plated steel sheets, chromium plated steel sheets, and the like. Zinc-based plated steel sheets are excellent in terms of corrosion resistance and are preferable. Furthermore, Zn—Al—Mg alloy plated steel sheets are superior in terms of corrosion resistance and are thus more preferable.

In order to enhance the adhesiveness to the CFRP layer 12, the surface of the metal member 11 is preferably treated with a primer. As the primer that is used in this treatment, for example, a silane coupling agent or a triazinethiol derivative is preferable. As the silane coupling agent, examples of ordinarily well-known silane coupling agents include γ-(2-aminoethyl)aminopropyltrimethoxysilane, γ-(2-aminoethyl) aminopropylmethyldimethoxysilane, γ-(2-aminoethyl)aminopropyltriethoxysilane, γ-(2-aminoethyl) aminopropylmethyldiethoxysilane, γ-(2-aminoethyl) aminopropylmethyldimethoxysilane, γ-methacryloxypropyltrimethoxysilane, γ-methacryloxypropylmethyldimethoxysilane, γ-methacryloxypropyltriethoxysilane, γ-methacryloxypropylmethyldiethoxysilane, N-β-(N-vinylbenzylaminoethyl)-γ-aminopropyltrimethoxysilane, N-β-(N-vinylbenzylaminoethyl)-γ-aminopropylmethyldimethoxysilane, N-β-(N-vinylbenzylaminoethyl)-γ-aminopropyltriethoxysilane, N-β-(N-vinylbenzylaminoethyl)-γ-aminopropylmethyldiethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, γ-mercaptopropyltrimethoxysilane, γ-mercaptopropylmethyldimethoxysilane, γ-mercaptopropyltriethoxysilane, γ-mercaptopropylmethyldiethoxysilane, methyltrimethoxysilane, dimethyldimethoxysilane, methyltriethoxysilane, dimethyldiethoxysilane, vinyltriacetoxysilane, γ-chloropropyltrimethoxysilane, γ-chloropropylmethyldimethoxysilane, γ-chloropropyltriethoxysilane, γ-chloropropylmethyldiethoxysilane, hexamethyldisilazane, γ-anilinopropyltrimethoxysilane, γ-anilinopropylmethyldimethoxysilane, γ-anilinopropyltriethoxysilane, γ-anilinopropylmethyldiethoxysilane, vinyltrimethoxysilane, vinylmethyldimethoxysilane, vinyltriethoxysilane, vinylmethyldiethoxysilane, octadecyldimethyl[3-(trimethoxysilyl)propyl]ammonium chloride, octadecyldimethyl[3-(methyldimethoxysilyl)propyl]ammonium chloride, octadecyldimethyl[3-(triethoxysilyl)propyl]ammonium chloride, octadecyldimethyl[3-(methyldiethoxysilyl)propyl]ammonium chloride, γ-chloropropylmethyldimethoxysilane, γ-mercaptopropylmethyldimethoxysilane, methyltrichlorosilane, dimethyldichlorosilane, trimethylchlorosilane, and the like, and, when a silane coupling agent having a glycidyl ether group, for example, γ-glycidoxypropyltrimethoxysilane or γ-glycidoxypropyltriethoxysilane having a glycidyl ether group is used, the processing adhesiveness to coverings particularly improves. Furthermore, when a triethoxy-type silane coupling agent is used, it is possible to improve the preservation stability of a surface treatment agent for painting (primer). This is considered to be because triethoxysilane is relatively stable in aqueous solutions and has a slow polymerization rate. One kind of silane coupling agent may be used or two or more kinds of silane coupling agents may be jointly used. Examples of the triazinethiol derivative include 6-diallylamino-2,4-dithiol-1,3,5-triazine, monosodium 6-methoxy-2,4-dithiol-1,3,5-triazine, 6-propyl-2,4-dithiolamino-1,3,5-triazine monosodium, 2,4,6-trithiol-1,3,5-triazine, and the like.

(CFRP Layer 12)

The CFRP layer 12 is joined to the metal member 11 through the resin coating layer 13 described below. That is, the CFRP layer 12 is disposed on the surface of the resin coating layer 13. In the present embodiment, an aspect in which the CFRP layer 12 is disposed on only a part of the surface of the resin coating layer 13 has been described for the purpose of describing the effect that the present invention exhibits, but the present invention is not limited to the aspect shown in the drawing, and the CFRP layer can be disposed on all or a part of the surface of the resin coating layer 13 in an arbitrary shape. In addition, for a reason described below, it is possible to form a relatively uniform electrode-position-coated coating on a surface 125 of the CFRP layer 12.

The CFRP layer 12 has a matrix resin 123 and a carbon fiber material 121 that is contained in and is complexed to the matrix resin 123.

The carbon fiber material 121 is not particularly limited, and, for example, any of PAN-based carbon fiber materials and pitch-based carbon fiber materials can be used and may be selected depending on the purpose or use. In addition, as the carbon fiber material 121, one kind of fiber described above may be used singly or a plurality of kinds of fibers may be jointly used.

As a reinforcing fiber base material that serves as a base material of the carbon fiber material 121 in the CFRP that is used in the CFRP layer 12, it is possible to use, for example, a non-woven fabric base material in which chopped fibers are used, a cloth material in which a continuous fiber is used, a unidirectional reinforced fiber base material (UD material), and the like. From the viewpoint of a reinforcing effect, a cloth material or a UD material is preferably used as the reinforcing fiber base material.

As the matrix resin 123, it is possible to use a solidified substance or cured substance of a resin composition. Here, "solidified substance" refers to a resin composition in which a resin component itself is solidified, and "cured substance" refers to a resin composition in which a resin component is cured by adding a variety of curing agents to the resin component. Examples of the curing agent that can be contained in the cured substance include crosslinking agents described below, and "cured substance" is defined to include a cross-linked cured substance formed by crosslinking.

As the resin composition that configures the matrix resin 123, any of a thermosetting resin and a thermoplastic resin can be used, but a thermoplastic resin is preferably contained as a main component. The kind of the thermoplastic resin that can be used in the matrix resin 123 is not particularly limited, and it is possible to use one or more kinds selected from a phenoxy resin, a polyolefin and an acid-modified polyolefin, polystyrene, polymethyl methacrylate, an AS resin, an ABS resin, a thermoplastic aromatic polyester such as polyethylene terephthalate or polybutylene terephthalate, polycarbonate, a polyimide, a polyamide, a polyamide-imide, polyetherimide, polyethersulfone, a polyphenylene ether and a modified polyphenylene ether, a polyphenylene sulfide, polyoxymethylene, polyallylate, polyetherketone, polyetheretherketone, polyetherketoneketone, nylon, and the like. "Thermoplastic resin" also includes resins that can become a cross-linked cured substance in a second cured state described below. In addition, as the thermosetting resin that can be used in the matrix resin 123, it is possible to use, for example, one or more selected from a phenoxy resin, an epoxy resin, a vinyl ester resin, a phenol resin, and a urethane resin.

Here, in a case where the matrix resin 123 contains a thermoplastic resin, it is possible to solve the above-described problems caused at the time of using a thermosetting resin as the matrix resin of the CFRP, that is, problems in that the CFRP layer 12 is brittle, the takt time is long, bending is not possible, and the like. However, ordinarily, thermoplastic resins become highly viscous when melted and, unlike thermosetting resins, such as an epoxy resin, before thermally cured, cannot be in a low-viscosity state at the time of impregnating the carbon fiber material 121 and are thus poor in terms of the impregnation property with respect to the carbon fiber material 121. Therefore, it is not possible to increase the density of the reinforcing fiber (VF: volume fraction) in the CFRP layer 12 as in the case of using a thermosetting resin as the matrix resin 123. For example, in the case of using an epoxy resin as the matrix resin 123, it is possible to set the VF to approximately 60%; however, in the case of using a thermoplastic resin such as polypropylene or nylon as the matrix resin 123, the VF becomes approximately 50%. In addition, when a thermoplastic resin such as polypropylene or nylon is used, it is not possible for the CFRP layer 12 to have high heat resistance as in the case of using a thermosetting resin such as an epoxy resin.

In order to solve the problem caused at the time of using such a thermoplastic resin, a phenoxy resin is preferably used as the matrix resin 123. The phenoxy resin is very similar to an epoxy resin in molecular structure and thus has approximately the same degree of heat resistance as an epoxy resin, and the adhesiveness to the metal member 11 or the carbon fiber material 121 becomes favorable. Furthermore, the phenoxy resin can be made into a so-called partially curable resin by adding a curing component such as an epoxy resin to the phenoxy resin and copolymerizing both. The use of such a partially curable resin as the matrix resin 123 makes it possible to produce a matrix resin having an excellent impregnation property with respect to the carbon fiber material 121. Furthermore, the thermal curing of the curing component in the partially curable resin makes it possible to suppress the matrix resin 123 in the CFRP layer 12 being melted or softened when exposed to high temperatures like ordinary thermoplastic resins. The amount of the curing component added to the phenoxy resin may be appropriately determined in consideration of the impregnation property with respect to the carbon fiber material 121, the brittleness of the CFRP layer 12, the takt time, the processability, and the like. As described above, the use of the phenoxy resin as the matrix resin 123 makes the addition and control of a curing component having as high a degree of freedom as possible.

A sizing agent having a favorable affinity to epoxy resins is often applied to the surface of the carbon fiber material 121. Since the phenoxy resin is very similar to an epoxy resin in structure, the use of the phenoxy resin as the matrix resin 123 makes it possible to use sizing agents for epoxy resins as they are. Therefore, the use of the phenoxy resin makes it possible to enhance the cost competitiveness.

In addition, among thermoplastic resins, the phenoxy resin has favorable formability, is excellent in terms of the adhesiveness to the carbon fiber material 121 or the metal member 11, and additionally, can be provided with the same properties as those of highly heat-resistant formed thermosetting resins by using an acid anhydride, an isocyanate compound, caprolactam, or the like as a crosslinking agent. Therefore, in the present embodiment, as the resin component of the matrix resin 123, a solidified substance or cured substance of a resin composition containing 50 parts by mass or more of the phenoxy resin with respect to 100 parts by mass of the resin component is preferably used. The use of such a resin composition makes it possible to strongly join the metal member 11 and the CFRP layer 12. The resin composition more preferably contains 55 parts by mass or more of the phenoxy resin in 100 parts by mass of the resin component. The form of the adhesive resin composition can be set to, for example, a powder, a liquid such as varnish, or a solid such as a film.

The amount of the phenoxy resin can be measured by, as described below, infrared spectroscopy (IR), and, in the case of analyzing the amount proportion of the phenoxy resin from the resin composition, which is the object of IR, the amount can be measured using an ordinary method of IR analyses such as a transmission method or an ART reflection method.

The CFRP layer 12 is cut out with a sharp blade or the like, and as many fiber strands are removed with tweezers as possible, thereby sampling the resin composition, which becomes the analysis object, from the CFRP layer 12. In the case of the transmission method, a KBr powder and the powder of the resin composition, which becomes the analysis object, are crushed while being uniformly mixed in a mortar or the like, thereby producing a thin film which is used as a specimen. In the case of the ART reflection method, a specimen may be produced by, in the same manner as in the transmission method, crushing the powders while uniformly mixing the powders in a mortar and thereby producing a tablet or a specimen may be produced by making a cut on the surface of a monocrystalline KBr tablet (for example, 2 mm in diameter and 1.8 mm in thickness) with a file or the like and sprinkling and attaching the powder of the resin composition, which becomes the analysis object, to the monocrystalline KBr tablet. In any of the methods, it is important to measure the background of pure KBr before the KBr is mixed with the resin, which becomes the analysis object. As an IR measuring instrument, an ordinary commercially available measuring instrument can be used; however, regarding the accuracy, a measuring instrument having an analysis accuracy enabling differentiation in a unit of one percent for absorbance and in a unit of one inverse centimeter for wave number is preferable, and examples thereof include FT/IR-6300 manufactured by JASCO Corporation and the like.

In the case of inspecting the amount of the phenoxy resin, since the absorption peak of the phenoxy resin is present at, for example, 1450 to 1480 $cm^{-1}$, near 1500 $cm^{-1}$, near 1600 $cm^{-1}$, or the like, it is possible to calculate the amount based on the intensity of the same absorption peak.

"Phenoxy resin" is a linear polymer that is obtained from a condensation reaction between a divalent phenol compound and epihalohydrin or a polyaddition reaction between a divalent phenol compound and a bifunctional epoxy resin and is an amorphous thermoplastic resin. The phenoxy resin can be obtained by a well-known method in the related art in a solution or in the absence of a solvent and can be used in any form of a powder, a varnish, and a film. The average molecular weight of the phenoxy resin is, for example, within a range of 10,000 or more and 200,000 or less, preferably within a range of 20,000 or more and 100,000 or less, and more preferably within a range of 30,000 or more and 80,000 or less in terms of the mass-average molecular weight (Mw). When the Mw of the phenoxy resin (A) is set within a range of 10,000 or more, the strength of a compact can be increased, and this effect is further enhanced by setting the Mw to 20,000 or more and even further enhanced by setting the Mw to 30,000 or more. On the other hand, when the Mw of the phenoxy resin is set to 200,000 or less, it is possible to make the phenoxy resin excellent in terms of the workability or processability, and this effect is further enhanced by setting the Mw to 100,000 or less and even further enhanced by setting the Mw to 80,000 or less. The Mw in the present specification is defined as a value that is measured by gel permeation chromatography (GPC) and converted using a standard polystyrene calibration curve.

The hydroxyl equivalent (g/eq) of the phenoxy resin that is used in the present embodiment is, for example, within a range of 50 or more and 1000 or less, preferably within a range of 50 or more and 750 or less, and more preferably within a range of 50 or more and 500 or less. When the hydroxyl equivalent of the phenoxy resin is set to 50 or more, since the water absorption rate decreases due to a decrease in the number of hydroxyl groups, it is possible to improve the mechanical properties of the cured substance. On the other hand, when the hydroxyl equivalent of the phenoxy resin is set to 1,000 or less, since it is possible to suppress a decrease in the number of the hydroxyl groups, it is possible to improve the mechanical properties of the metal-CFRP composite 1 by improving the affinity to an adherend. This effect is further enhanced by setting the hydroxyl equivalent to 750 or less, furthermore, 500 or less.

In addition, the glass transition temperature (Tg) of the phenoxy resin is, for example, appropriately a glass transition temperature within a range of 65° C. or higher and 150° C. or lower and preferably within a range of 70° C. or higher and 150° C. or lower. When the Tg is 65° C. or higher, since it is possible to suppress an excessive increase in the fluidity of the resin while securing formability, it is possible to secure a sufficient thickness for the resin coating layer 13. On the other hand, when the Tg is 150° C. or lower, since the melt viscosity becomes low, it becomes easy to impregnate the reinforcing fiber base material with the phenoxy resin without generating a defect such as a void, and it is possible to carry out a joining process at lower temperatures. The Tg of the resin in the present specification is a numerical value that is measured at a temperature within a range of 20° C. to 280° C. under a temperature rise condition of 10° C./minute using a differential scanning calorimeter and calculated from a peak value of the second scanning.

The phenoxy resin is not particularly limited as long as the phenoxy resin has the above-described physical properties, and examples of preferable phenoxy resins include bisphenol A-type phenoxy resins (for example, PHENOTOTO YP-50, PHENOTOTO YP-50S, and PHENOTOTO YP-55U manufactured by Nippon Steel & Sumikin Chemical Co., Ltd. can be procured), bisphenol F-type phenoxy resins (for example, PHENOTOTO FX-316 manufactured by Nippon Steel & Sumikin Chemical Co., Ltd. can be procured), copolymerization-type phenoxy resins of bisphenol A and bisphenol F (for example, YP-70 manufactured by Nippon Steel & Sumikin Chemical Co., Ltd. can be procured), special phenoxy resins other than the phenoxy resins exemplified above such as brominated phenoxy resins, phosphorus-containing phenoxy resins, and sulfone group-containing phenoxy resins (for example, PHENOTOTO YPB-43C, PHENOTOTO FX293, YPS-007, and the like manufactured by Nippon Steel & Sumikin Chemical Co., Ltd. can be procured), and the like. These resins can be used singly or two or more resins can be used in a mixture form.

The thermoplastic resin that is used as the resin component in the matrix resin 123 is preferably a thermoplastic resin having, at any temperature within a range of 160° C. to 250° C., a melt viscosity of 3,000 Pa·s or less, more preferably a thermoplastic resin having a melt viscosity within a range of 90 Pa·s or more and 2,900 Pa·s or less, and still more preferably a thermoplastic resin having a melt viscosity within a range of 100 Pa·s or more and 2,800 Pa·s or less. When the melt viscosity at a temperature within a range of 160° C. to 250° C. is set to 3,000 Pa·s or less, the fluidity during the fusion becomes favorable, and a defect such as a void is unlikely to be generated in the CFRP layer 12. On the other hand, when the melt viscosity is 90 Pa·s or more, it is possible to make the molecular weight of the resin composition appropriate and to suppress embrittlement and an embrittlement-induced decrease in the mechanical strength of the metal-CFRP composite 1.

In addition, the resin composition that configures the matrix resin 123 may be a crosslinkable resin composition obtained by blending a crosslinking agent into the above-described resin composition. For example, the crosslinkable resin composition (that is, a cured substance of the resin composition) can also be produced by blending, for example, an acid anhydride, an isocyanate, caprolactam, or the like as a crosslinking agent into the resin composition containing the phenoxy resin (hereinafter, also referred to as "phenoxy resin (A)"). When a crosslinking reaction is caused using a secondary hydroxyl group that is contained in the phenoxy resin (A), since the heat resistance of the resin composition improves, the crosslinkable resin composition becomes advantageous in terms of being applied to members that are used under environments with higher temperatures. In the formation of a crosslin using the secondary hydroxyl group of the phenoxy resin (A), a crosslinkable resin composition into which a crosslinking curable resin (B) and a crosslinking agent (C) are blended is preferably used. As the crosslinking curable resin (B), for example, an epoxy resin or the like can be used, and there is no particular limitation. The use of such a crosslinkable resin composition makes it possible to obtain a cured substance (cross-linked cured substance) in a second cured state in which the Tg of the resin composition has significantly improved compared with a case where the resin composition contains the phenoxy resin (A) alone. The Tg of the cross-linked cured substance of the crosslinkable resin composition is, for example, 160° C. or higher and preferably within a range of 170° C. or higher and 220° C. or lower.

In the crosslinkable resin composition, the crosslinking curable resin (B) that is blended into the phenoxy resin (A) is preferably a bi- or higher-functional epoxy resin. Examples of the bi- or higher-functional epoxy resin include bisphenol A-type epoxy resins (for example, EPOTOTO YD-011, EPOTOTO YD-7011, and EPOTOTO YD-900 manufactured by Nippon Steel & Sumikin Chemical Co., Ltd. can be procured), bisphenol F-type epoxy resins (for example, EPOTOTO YDF-2001 manufactured by Nippon Steel & Sumikin Chemical Co., Ltd. can be procured), diphenyl ether-type epoxy resins (for example, YSLV-80DE manufactured by Nippon Steel & Sumikin Chemical Co., Ltd. can be procured), tetramethylbisphenol F-type epoxy resins (for example, YSLV-80XY manufactured by Nippon Steel & Sumikin Chemical Co., Ltd. can be procured), bisphenol sulfide-type epoxy resins (for example, YSLV-120TE manufactured by Nippon Steel & Sumikin Chemical Co., Ltd. can be procured), hydroquinone-type epoxy resins (for example, EPOTOTO YDC-1312 manufactured by Nippon Steel & Sumikin Chemical Co., Ltd. can be procured), phenol novolac-type epoxy resins (for example, EPOTOTO YDPN-638 manufactured by Nippon Steel & Sumikin Chemical Co., Ltd. can be procured), orthocresol novolac-type epoxy resins (for example, EPOTOTO YDCN-701 EPOTOTO YDCN-702, EPOTOTO YDCN-703, and EPOTOTO YDCN-704 manufactured by Nippon Steel & Sumikin Chemical Co., Ltd. can be procured), aralkylnaphthalene diol novolac-type epoxy resins (for example, ESN-355 manufactured by Nippon Steel & Sumikin Chemical Co., Ltd. can be procured), triphenylmethane-type epoxy resins (for example, EPPN-502H manufactured by Nippon Kayaku Co., Ltd.) can be procured), and the like, but the bi- or higher-functional epoxy resin is not limited thereto. In addition, one kind of epoxy resin described above may be used singly or a mixture of two or more kinds of epoxy resin may be used.

In addition, while not intended to particularly limit the crosslinking curable resin (B), the crosslinking curable resin (B) is preferably a crystalline epoxy resin and more preferably a crystalline epoxy resin having a melting point in a range of 70° C. or higher and 145° C. or lower and a melt viscosity at 150° C. of 2.0 Pa·s or less. The use of a crystalline epoxy resin exhibiting such fusion characteristics makes it possible to decrease the melt viscosity of the crosslinkable resin composition as the resin composition and to improve the adhesiveness of the CFRP layer 12. In addition, when the melt viscosity is 2.0 Pa·s or less, it is possible to make the formability of the crosslinkable resin composition sufficiently excellent and to improve the homogeneity of the metal-CFRP composite 1.

Examples of crystalline epoxy resins preferable as the crosslinking curable resin (B) include EPOTOTO YSLV-80XY, YSLV-70XY, YSLV-120TE, and YDC-1312 manufactured by Nippon Steel & Sumikin Chemical Co., Ltd., YX-4000, YX-4000H, YX-8800, YL-6121H, YL-6640, and the like manufactured by Mitsubishi Chemical Corporation, HP-4032, HP-4032D, HP-4700, and the like manufactured by DIC Corporation, NC-3000 manufactured by Nippon Kayaku Co., Ltd., and the like.

The crosslinking agent (C) forms an ester bond with the secondary hydroxyl group of the phenoxy resin (A) and thereby three-dimensionally cross-links the phenoxy resin (A). Therefore, unlike a strong cross-link such as the curing of a thermosetting resin, the cross-link can be broken by a hydrolysis reaction, and thus it becomes possible to easily detach the metal member 11 and the CFRP layer 12. Therefore, the metal member 11 can be recycled.

As the crosslinking agent (C), an acid anhydride is preferable. The acid anhydride is not particularly limited as long as the acid anhydride is solid at normal temperature and rarely sublime, but is preferably an aromatic acid anhydride having two or more acid anhydrides that react with the hydroxyl groups of the phenoxy resin (A) from the viewpoint of heat resistance imparted to the metal-CFRP composite 1 and the reactiveness. In particular, an aromatic compound having two acid anhydride groups like a pyromellitic anhydride increases the crosslinking density compared with a combination of a trimellitic anhydride and a hydroxyl group and improves the heat resistance and is thus preferably used. Even among aromatic acid dianhydrides, for example, aromatic acid dianhydrides that are compatible with a phenoxy resin and an epoxy resin such as 4,4'-oxydiphthalic acid, ethylene glycol bisanhydrotrimellitate, and 4,4'-(4,4'-isopropylidenediphenoxy) diphthalic anhydride have a significant Tg improvement effect and are more preferable. In particular, an aromatic acid dianhydride having two acid anhydride groups like a pyromellitic anhydride improves the crosslinking density compared with, for example, a phthalic anhydride having only one acid anhydride group and improves the heat resistance and is thus preferably used. That is, the aromatic acid dianhydride has two acid anhydride groups and thus has favorable reactiveness, which makes it possible to obtain a cross-linked cured substance having a strength high enough for demolding within a short period of forming time and generates four carboxyl groups by an esterification reaction with the secondary hydroxyl group in the phenoxy resin (A), whereby it is possible to increase the final crosslinking density.

Regarding the reaction among the phenoxy resin (A), the epoxy resin as the crosslinking curable resin (B), and the crosslinking agent (C), the resin composition is cross-linked and cured by the esterification reaction between the secondary hydroxyl group in the phenoxy resin (A) and the acid anhydride group of the crosslinking agent (C) and, furthermore, a reaction between a carboxyl group generated by the esterification reaction and an epoxy group of the epoxy resin. A phenoxy resin cross-linked body can be obtained by a reaction between the phenoxy resin (A) and the crosslinking agent (C), but the coexistence of the epoxy resin decreases the melt viscosity of the resin composition, and thus excellent characteristics such as the improvement of the impregnation property with respect to the adherend (resin coating layer 13), the acceleration of the crosslinking reaction, the improvement of the crosslinking density, and the improvement of the mechanical strength are exhibited.

In the crosslinkable resin composition, the epoxy resin as the crosslinking curable resin (B) coexists, but the main component is the phenoxy resin (A), which is a thermoplastic resin, and it is considered that the esterification reaction between the secondary hydroxyl group of the phenoxy resin (A) and the acid anhydride group of the crosslinking agent (C) is prioritized. That is, since the reaction between the acid anhydride, which is used as the crosslinking agent (C), and the epoxy resin, which is used as the crosslinking curable resin (B), takes a long period of time (the reaction rate is slow), the reaction between the crosslinking agent (C) and the secondary hydroxyl group of the phenoxy resin (A) occurs earlier, and then the crosslinking agent (C) left from the prior reaction or a residual carboxyl group derived from the crosslinking agent (C) and the epoxy resin react with each other, whereby the crosslinking density further increases. Therefore, unlike resin compositions containing an epoxy resin, which is a thermosetting resin, as a main component, a cross-linked cured substance that is obtained from the crosslinkable resin composition is a thermoplastic resin and is also excellent in terms of the storage stability.

In the crosslinkable resin composition in which the crosslinking of the phenoxy resin (A) is used, the crosslinking curable resin (B) is preferably contained such that the amount thereof falls into a range of 5 parts by mass or more and 85 parts by mass or less with respect to 100 parts by mass of the phenoxy resin (A). The amount of the crosslinking curable resin (B) with respect to 100 parts by mass of the phenoxy resin (A) is more preferably in a range of 9 parts by mass or more and 83 parts by mass or less and still more preferably in a range of 10 parts by mass or more and 80 parts by mass or less. When the amount of the crosslinking curable resin (B) is set to 85 parts by mass or less, since it is possible to shorten the curing time of the crosslinking curable resin (B), it becomes easy to obtain a strength necessary for demolding within a short period of time, and additionally, the recyclability of the CFRP layer 12 improves. This effect is further enhanced by setting the amount of the crosslinking curable resin (B) to 83 parts by mass or less and even further enhanced by setting the amount of the crosslinking curable resin (B) to 80 parts by mass or less. On the other hand, when the amount of the crosslinking curable resin (B) is set to 5 parts by mass or more, it becomes easy to obtain the crosslinking density improvement effect of the addition of the crosslinking curable resin (B), the cross-linked cured substance of the crosslinkable resin composition is likely to develop a Tg of 160° C. or higher, and the fluidity becomes favorable.

Regarding the amount of the crosslinking curable resin (B), the amount of the crosslinking curable resin (B) can be measured by measuring the amount in the same manner for a peak derived from the epoxy resin by the above-described method in which IR is used.

The amount of the crosslinking agent (C) blended is ordinarily an amount in which the amount of the acid anhydride group is in a range of 0.6 mol or more and 1.3 mol or less with respect to 1 mol of the secondary hydroxyl group of the phenoxy resin (A), preferably an amount in which the amount of the acid anhydride group is in a range of 0.7 mol or more and 1.3 mol or less, and more preferably an amount in which the amount of the acid anhydride group is in a range of 1.1 mol or more and 1.3 mol or less. When the amount of the acid anhydride group is 0.6 mol or more, since the crosslinking density increases, the mechanical properties or the heat resistance is excellent. This effect is further enhanced by setting the amount of the acid anhydride group to 0.7 mol or more and even further enhanced by setting the amount of the acid anhydride group to 1.1 mol or more. When the amount of the acid anhydride group is 1.3 mol or less, it is possible to suppress an unreacted acid anhydride or carboxyl group adversely affecting the curing characteristics or the crosslinking density. Therefore, it is preferable to adjust the amount of the crosslinking curable resin (B) blended depending on the amount of the crosslinking agent (C) blended. Specifically, for example, the amount of the epoxy resin blended is preferably set such that the equivalent ratio to the crosslinking agent (C) falls into a range of 0.5 mol or more and 1.2 mol or less for the purpose of causing the carboxyl group that is generated by the reaction between the secondary hydroxyl group of the phenoxy resin (A) and the acid anhydride group of the crosslinking agent (C) to be reacted by the epoxy resin that is used as the crosslinking curable resin (B). The equivalent ratio between the crosslinking agent (C) and the epoxy resin is preferably in a range of 0.7 mol or more and 1.0 mol or less.

When the crosslinking agent (C) is blended together with the phenoxy resin (A) and the crosslinking curable resin (B), it is possible to obtain a crosslinkable resin composition, but an accelerator (D) may be further added as a catalyst such that the crosslinking reaction is reliably caused. The accelerator (D) is not particularly limited as long as the accelerator (D) is solid at normal temperature and does not sublimes, and examples thereof include tertiary amines such as triethylenediamine, imidazoles such as 2-methylimidazole, 2-phenylimidazole, and 2-phenyl-4-methylimidazole, organic phosphines such as triphenylphosphine, tetraphenylborates such as tetraphenylphosphonium tetraphenylborate, and the like. One kind of accelerator (D) may be used singly or two or more kinds of accelerators (D) may be jointly used. In the case of forming the matrix resin 123 by producing the crosslinkable resin composition as a fine powder and attaching the fine powder-form crosslinkable resin composition to the reinforcing fiber base material using a powder coating method by an electrostatic field, an imidazole-based latent catalyst that has a catalyst activating temperature of 130° C. or higher and is solid at normal temperature is preferably used as the accelerator (D). In the case of using the accelerator (D), the amount of the accelerator (D) blended is preferably set in a range of 0.1 parts by mass or more and 5 parts by mass or less with respect to 100 parts by mass of the total amount of the phenoxy resin (A), the crosslinking curable resin (B), and the crosslinking agent (C).

The crosslinkable resin composition is solid at normal temperature, and, regarding the melt viscosity thereof, the lowest melt viscosity that is the lower limit value of the melt viscosity at a temperature within a range of 160° C. to 250° C. is preferably 3,000 Pa·s or less, more preferably 2,900 Pa·s or less, and still more preferably 2,800 Pa·s or less. When the lowest melt viscosity at a temperature within a range of 160° C. to 250° C. is set to 3,000 Pa·s or less, since it is possible to sufficiently impregnate the adherend with the crosslinkable resin composition during the heating and compression of the crosslinkable resin composition by hot press or the like and to suppress the generation of a defect such as a void in the CFRP layer 12, the mechanical properties of the metal-CFRP composite 1 improve. This effect is further enhanced by setting the lowest melt viscosity at a temperature within a range of 160° C. to 250° C. to 2,900 Pa·s or less and even further enhanced by setting the lowest melt viscosity to 2,800 Pa·s or less.

Into the resin composition (including the crosslinkable resin composition) for forming the matrix resin 123, other additives, for example, natural rubber, synthetic rubber, an elastomer, or the like, a variety of inorganic fillers, a solvent, an extender pigment, a colorant, an antioxidant, an ultraviolet inhibitor, a flame retardant, and a flame-retarding agent may be blended as long as the adhesiveness or physical properties of the resin composition are not impaired.

In the metal-CFRP composite 1, the matrix resin 123 in the CFRP layer 12 and a resin that configures the resin coating layer 13 may be the same resin or different resins. However, from the viewpoint of securing sufficient adhesiveness between the CFRP layer 12 and the resin coating layer 13, as the matrix resin 123, the same resin or the same kind of resin as the resin that forms the resin that configures the resin coating layer 13 or a kind of resin that is similar to the resin that configures the resin coating layer 13 in terms of the fraction or the like of a polar group that is contained in a polymer is preferably selected. Here, "the same resin" means that a resin that is made up of the same main components in the same composition fractions as the coating resin, and "the same kind of resin" means a resin that is made up of the same components, but may be different in the composition fractions. "The same kind of resin" includes "the same resin". In addition, "the main component" refers to a component that accounts for 50 parts by mass or more in 100 parts by mass of the total resin components. The "resin components" include the thermoplastic resin or the thermosetting resin, but do not include a non-resin component such as the crosslinking agent.

In the metal-CFRP composite 1, the CFRP layer 12 is formed using at least one pre-preg for forming the CFRP. The number of the pre-pregs for forming the CFRP to be laminated can be selected depending on a desired thickness of the CFRP layer 12.

(Resin Coating Layer 13)

The resin coating layer 13 is disposed between the metal member 11 and the CFRP layer 12 of the metal-CFRP composite 1 and joins both. In addition, the resin coating layer 13 has an insulating property under corrosive environments and insulates the metal member 11 and the CFRP layer 12 from each other. Specific examples of the corrosive environments include environments in which moisture is attached to and/or present in the circumference of the metal-CFRP composite 1 during or after water leaks from the metal-CFRP composite 1.

In addition, the resin coating layer 13 contains at least one or a plurality of kinds of metal particles, intermetallic compound particles, conductive oxide particles, and conductive non-oxide ceramic particles as the conductive particles 131 and further contains a binder resin 133. The conductive particles 131 have a powder resistivity at 23° C. to 27° C. of $7.0 \times 10^7$ Ω·cm or less and contain one or more selected from the group consisting of Zn, Si, Zr, V, Cr, Mo, Mn, and W as a configuration element. Therefore, in the metal-CFRP composite 1, galvanic corrosion of dissimilar materials is suppressed, and the electrodeposition coatability becomes excellent.

First, galvanic corrosion of dissimilar materials will be described in detail. Ordinarily, the CFRP layer and the metal member are joined together through the resin coating layer by thermal compression. At this time, some of the carbon fiber material in the CFRP layer is pressed by a pressure applied during thermal compression and protrudes from the surface of the CFRP layer. In addition, the protruding carbon fiber material penetrates through the resin coating layer, which makes the carbon fiber material and the metal member come into contact with each other and causes corrosion due to an electrolytic corrosion action.

In contrast, in the present embodiment, the conductive particles 131 contain one or a plurality of kinds of Zn, Si, Zr, V, Cr, Mo, Mn, and W and thereby act as a rust-preventing pigment. Therefore, in a case where the carbon fiber material 121 has protruded from the surface of the CFRP layer 12, first, the carbon fiber material 121 intrudes into the resin coating layer 13 and comes into contact with the conductive particles 131. Next, a metal component in the conductive particles 131 that is noble compared with the metal member 11 or the carbon fiber material 121 under corrosive environments develops a sacrificial corrosion prevention action, the metal component in the conductive particles 131 are eluted as metal ions, and an oxide or hydroxide of the eluted metal component of the conductive particles 131 is also deposited on the surfaces of the conductive particles 131. Furthermore, the oxide or hydroxide of the eluted metal component of the conductive particles 131 are also deposited on the surfaces of the metal member 11 and the carbon fiber material 121 in the same manner, and the oxidation of the metal member 11 is prevented. Furthermore, the conductive particles 131 form an oxide having a degraded conductive property in an oxidized portion and acts as a protective film in the oxidized periphery. As a result, galvanic corrosion of dissimilar materials is suppressed.

In addition, the powder resistivity at 23° C. to 27° C. of the conductive particles 131 is $7.0 \times 10^7$ Ω·cm or less. Therefore, during an electrodeposition coating treatment, it becomes possible to make the carbon fiber material 121 and the metal member 11 electrically conductive to each other through the conductive particles 131, and the formation of a relatively uniform electrodeposition-coated coating on the surface 125 of the CFRP layer 12 becomes possible. Furthermore, even on a surface 135 of the resin coating layer 13 that is not coated with the CFRP layer 12, it becomes possible to make the metal member 11 electrically conductive with the conductive particles 131, and the formation of a relatively uniform electrodeposition-coated coating becomes possible.

As described above, in the present embodiment, the specific conductive particles 131 are adopted in the resin coating layer 13, whereby the suppression of galvanic corrosion of dissimilar materials and the improvement of the electrodeposition coatability are achieved at the same time.

A component that is contained most in the metal member 11 can become the main component of the metal member 11. For example, in the case of steel or plated steel, the main component of the metal member 11 is an element that configures the base material of the metal member 11 and is contained most, that is, Fe.

In addition, the powder resistivity at 23° C. to 27° C. of the conductive particles 131 is $7.0 \times 10^7$ Ω·cm or less as described above. Since the conductivity of the conductive particles 131 is relatively large as described above, the conductive particles 131 enable the carbon fiber material 121 and the metal member 11 to be electrically conductive to each other. In contrast, in a case where the powder resistivity at 23° C. to 27° C. of the conductive particles 131 exceeds $7.0 \times 10^7$ Ω·cm, the electric conduction between the carbon fiber material 121 and the metal member 11 becomes insufficient, and the electrodeposition coatability does not become sufficiently favorable. The powder resistivity at 23° C. to 27° C. of the conductive particles 131 can be obtained by measuring the resistance of a powder particle compressed at 10 MPa using a commercially available powder resistance meter, for example, "powder resistivity measurement system MCP-PD51" manufactured by Mitsubishi Chemical Analytech Co., Ltd. In addition, ordinarily, the powder resistivity can be regarded as being the same as the volume resistivity of the material itself of the conductive particles 131 to be measured.

Specifically, the conductive particles 131 are preferably metal particles containing one or more selected from the group consisting of Zn, Si, Zr, V, Cr, Mo, Mn, and W as a configuration element and are also preferably intermetallic compound particles containing one or more selected from the group consisting of Zn, Si, Zr, V, Cr, Mo, Mn, and W, for example, ferrosilicon or ferromanganese. In addition, a conductive oxide or non-oxide ceramic containing one or more selected from the group consisting of Zn, Si, Zr, V, Cr, Mo, Mn, and W is also preferable.

Here, as the conductive oxide, it is possible to use a substance that is made conductive by doping an impurity into the crystal lattice of an oxide (doped conductive oxide) or a substance obtained by modifying the surface of an oxide with a conductive substance. As the former substance, it is possible to use ordinarily well-known substances such as metal oxides into which one or more metal elements selected from Al, Nb, Ga, Sn, and the like are doped (for example, Al-doped zinc oxide, Nb-doped zinc oxide, Ga-doped zinc oxide, Sn-doped zinc oxide, and the like). As the latter substance, it is possible to use ordinarily well-known substances such as zinc oxide or silica obtained by modifying an oxide with conductive $SnO_2$. The conductive oxide is preferably the doped conductive oxide, and the doped conductive oxide is preferably Al-doped zinc oxide.

In addition, the non-oxide ceramic refers to a ceramic made of an element or compound containing no oxygen, and examples thereof include boride ceramic, carbide ceramic, nitride ceramic, and silicide ceramic. In addition, the boride ceramic, the carbide ceramic, the nitride ceramic, and the silicide ceramic each refer to a non-oxide ceramic containing boron B, carbon C, nitrogen N, or silicon S as a main non-metal configuration element, and, as ordinarily well-known non-oxide ceramic, it is possible to use non-oxide ceramic containing one or more selected from the group consisting of Zn, Si, Zr, V, Cr, Mo, Mn, and W. Furthermore, the non-oxide ceramic particles are more preferably non-oxide ceramics exemplified below from the viewpoint of the presence or absence of industrial products, stable distributiveness in domestic and international markets, prices, electric resistivity, and the like. For example, the particles of $Mo_2B$, $MoB$, $MoB_2$, $Mo_2Bs$, $NbB_2$, $VB$, $VB_2$, $W_2B_5$, $ZrB_2$, $Mo_2C$, $V_2C$, $VC$, $WC$, $W_2C$, $ZrC$, $Mo_2N$, $VN$, $ZrN$, $Mo_3Si$, $Mo_5Si_3$, $MoSi_2$, $NbSi_2$, $Ni_2Si$, $Ta_2Si$, $TaSi_2$, $TiSi$, $TiSi_2$, $VsSi_3$, $VSi_2$, $W_3Si$, $WSi_2$, $ZrSi$, $ZrSi_2$, $CrB$, $CrB_2$, $Cr_3C_2$, $Cr_2N$, or CrSi and the particles of a mixture of two or more kinds selected from the above-described substances are more preferable.

Among the above-described substances, from the viewpoint of reliably suppressing corrosion including galvanic corrosion of dissimilar materials, the conductive particles 131 are preferably one or more kinds selected from the conductive oxide particles, the non-oxide ceramic particles, and the intermetallic compound particles, more preferably one or more kinds selected from the group consisting of Al-doped zinc oxide, $ZrB_2$, $MoSi_2$, $CrB_2$, $WSi_2$, $VB_2$, ferrosilicon, and ferromanganese, and still more preferably one or more kinds selected from the group consisting of Al-doped zinc oxide, $VB_2$, and ferromanganese.

The average particle size of the conductive particles 131 is not particularly limited and is, for example, 50.0 µm or less and preferably 10.0 µm or less. When the average particle size of the conductive particles 131 is 50.0 µm or less, the particles 131 of an oxide or an inorganic salt protruding beyond the surface of the resin coating layer 13 are further suppressed, and, when the average particle size is 10.0 µm or less, the surface area of all particles in the coating becomes larger, and the particles are likely to be eluted under corrosive environments, such an average particle size is also effective for the corrosion resistance. When the average particle size is 10.0 µm or less, the above-described effect is further exhibited, which is preferable. Furthermore, when the average particle size of the conductive particles 131 is 1.0 µm or more, it is possible to more reliably bring the carbon fiber material 121 and the metal member 11 into contact with each other and to more reliably make the carbon fiber material 121 and the metal member 11 electrically conductive to each other. In the case of 1.0 µm or smaller nano-order fine particles, the primary particle sizes are nano-order sizes; however, when the fine particles aggregate due to the intermolecular force and the particle sizes as secondary particles become 1.0 µm or more, the effect is exhibited. Therefore, it is difficult to regulate the particle sizes of the secondary particles, and thus, in the invention of the present application, the lower limit of the conductive particles is not regulated.

As the average particle size of the conductive particles 131 in the resin coating layer 13, the particle size (D50) when the cumulative volume reached 50% in terms of the volume can be measured with an ordinarily well-known particle distribution measuring instrument, for example, laser diffraction and scattering-type particle size distribution measuring instrument (MICROTRAC MT3300EX, manufactured by Nikkiso Co., Ltd.) or the like. In addition, when it is necessary to confirm the average particle size of the particles that are added in a state of being mixed into the resin coating layer 13, it is possible to analyze an arbitrary cross section of the resin coating layer 13 with a field-emission electron probe micro analyzer (FE-EPMA) and obtain the average value of particle radii measured from a surface distribution photograph of the metal component that is contained in the conductive particles 131.

In addition, the volume rate of the conductive particles 131 in the resin coating layer 13 is preferably 1.0% or more and 40.0% or less. The volume rate of the conductive particles 131 is preferably 10.0% or more and 30.0% or less. When the volume rate of the conductive particles 131 is 1.0% or more, the conductive particles 131 are capable of more reliably making the metal member 11 and the carbon fiber material 121 electrically conductive to each other. In addition, when the volume rate of the conductive particles 131 is 40.0% or less, the cohesive failure of the resin coating layer 13 is prevented, and the adhesiveness between the resin coating layer 13 and the CFRP layer 12 becomes sufficiently excellent.

The volume rate of the conductive particles 131 in the resin coating layer 13 can be calculated from the specific gravity of a coating resin (binder resin 133) and the specific gravity of the conductive particles 131 by obtaining the solid content mass rate of the conductive particles 131 added at the time of producing the resin coating layer 13 in the resin coating layer 13.

In addition, regarding the volume rate of the conductive particles 131 in the resin coating layer 13, it is possible to regard an area rate obtained by analyzing an arbitrary cross section of the resin coating layer 13 with a field-emission electron probe micro analyzer (FE-EPMA) and carrying out an image analysis using a surface distribution photograph of the metal component that is contained in the conductive particles 131 as the volume rate of the conductive particles 131 in the resin coating layer 13. As a result of intensive studies, the present inventors found that the volume rate in the resin coating layer 13 and the area rate of the metal component that is contained in the conductive particles 131 measured in a cross section using an FE-EPMA are, strictly speaking, different from each other, but become close values, and thus, in the invention of the present application, the volume rate can be obtained as described above.

In addition, as described above, in the present embodiment, the resin coating layer 13 contains the binder resin 133. The binder resin 133 functions as a binder for the conductive particles. Such a binder resin 133 is not particularly limited, and any of a thermosetting resin and a thermoplastic resin can be used. Examples of the thermosetting resin include a urethane resin, an epoxy resin, a melamine resin, a vinyl ester resin, and the like. Examples of the thermoplastic resin include a phenoxy resin, a polyolefin (polypropylene or the like), an acid-modified polyolefin, a polyester resin such as polyethylene terephthalate or polybutylene terephthalate, polycarbonate, a polyimide, a polyamide, a polyamide-imide, polyetherimide, polyethersulfone, a polyphenylene ether, a modified polyphenylene ether, polyallylate, polyetherketone, polyetheretherketone, polyetherketoneketone, nylon, and the like. Examples of the phenoxy resin include the same phenoxy resin as the above-described phenoxy resin that can be used as the matrix resin 123 in the CFRP layer 12.

Among the above-described substances, the binder resin 133 preferably contains one or more kinds selected from the group consisting of a urethane resin, an epoxy resin, a polyester resin, and a melamine resin. While also depending on the molecular weight or the glass transition temperature, these resins easily flow at normal temperature or are easily dissolved in a solvent or the like and applied, which is preferable.

In the case of a CFRP layer in which the matrix resin is a phenoxy resin, the binder resin 133 is preferably a resin containing an epoxy resin or containing one or more kinds selected from the group consisting of a urethane resin, a polyester resin, and a melamine resin and an epoxy resin from the viewpoint of the adhesiveness to the CFRP layer. When the binder resin 133 is an epoxy resin or the above-described resin containing an epoxy resin, water or the like, which is a cause of corrosion, does not easily intrude into the interface between the phenoxy resin and the resin coating layer 13, and the corrosion resistance improves, which is preferable.

In addition, the glass transition temperature of the binder resin 133 is, for example, 100° C. or lower, preferably 10°

C. or higher and 60° C. or lower, and more preferably 10° C. or higher and 35° C. or lower. In such a case, the carbon fiber reinforced resin is not easily detached even when forming is carried out after the CFRP is stuck.

Into the resin coating layer 13, other additives, for example, natural rubber, synthetic rubber, an elastomer, or the like, a variety of inorganic fillers, a solvent, an extender pigment, a colorant, an antioxidant, an ultraviolet inhibitor, a flame retardant, and a flame-retarding agent may be blended as long as the adhesiveness or physical properties of the resin coating layer 13 are not impaired.

The average thickness of the resin coating layer 13 as described above is not particularly limited, but is, for example, 1.0 μm or more and 200.0 μm or less, preferably 5.0 μm or more and 50.0 μm or less, and more preferably 10.0 μm or more and 20.0 μm or less. When the average thickness of the resin coating layer 13 is 1.0 μm or more, the joining strength between the metal member 11 and the CFRP layer 12 through the resin coating layer 13 becomes sufficient. On the other hand, when the average thickness T of the resin coating layer 13 is 200.0 μm or less, the electric conduction between the metal member 11 and the CFRP layer 12 through the conductive particles 131 becomes more reliable. In addition, the cohesive failure of the resin coating layer 13 is prevented, and the adhesiveness between the resin coating layer 13 and the CFRP layer 12 becomes sufficiently excellent.

In addition, when the average thickness of the resin coating layer 13 is represented by T (μm) and the average particle size of the conductive particles 131 is represented by r (μm), T and r preferably satisfy a relationship of $0.5 \leq T/r \leq 300.0$. When the average particle size r of the conductive particles 131 and the average thickness T of the resin coating layer 13 satisfy a relationship of $T/r \leq 300.0$, the conductive property of the resin coating layer 13 improves, and the electrodeposition coatability further improves. In addition, when a relationship of $0.5 \leq T/r$ is satisfied, since the surface area of the conductive particles in the coating increases, and a larger amount of the metal component in the conductive particles dissolves out under corrosive environments, the resin coating layer 13 effectively acts on the corrosion resistance.

In the resin coating layer 13, not only the conductive particles, but also a ordinarily well-known rust-preventing pigment, for example, chromium (II) oxide, silica, vanadium (II) oxide, vanadium (V) oxide, manganese (II) oxide, manganese (III) oxide, magnesium oxide, zinc oxide, or the like can be used. As the inorganic salt, it is possible to add one or more kinds selected from the group consisting of chromates such as potassium chromate, calcium chromate, and strontium chromate, phosphates such as zinc phosphate, aluminum phosphate, aluminum tripolyphosphate, sodium phosphate, magnesium phosphate, trimagnesium phosphate, molybdenates such as potassium molybdenum and calcium molybdate, vanadates such as sodium metavanadate and calcium vanadate, tungstates such as calcium tungstate, sodium tungstate, and tungstic acid, and the like. When this substance is added, a metal ion also dissolves out of this rust-preventing pigment under corrosive environments and is likely to be deposited on the metal member 11, which becomes an anode, or the carbon fiber surface, which becomes a cathode, and becomes more effective for the corrosion resistance. In the case of adding the rust-preventing pigment, the amount of the rust-preventing pigment added can be appropriately selected as necessary.

In addition, the glass transition temperature of the resin coating layer 13 is, for example, 100° C. or lower, preferably 10° C. or higher and 60° C. or lower, and more preferably 10° C. or higher and 35° C. or lower. In such a case, the carbon fiber reinforced resin is not easily detached even when forming is carried out after the CFRP is stuck.

The glass transition temperature of the resin coating layer 13 can be measured by a thermomechanical analysis (TMA). As a thermomechanical analyzer, a commercially available analyzer, for example, "TMA7000 series" manufactured by Hitachi High-Tech Science Corporation can be used to carry out the thermomechanical analysis.

Hitherto, each configuration of the metal-CFRP composite 1 has been described.

The thicknesses of the metal member 11, the CFRP layer 12, and the resin coating layer 13 can be measured based on the cross section method of the optical method of JIS K 5600-1-7.5.4 as described below. That is, a specimen is embedded using a normal-temperature curable resin capable of tightly embedding the specimen with no harmful influences and using poorly viscous EPOMOUNT 27-777 manufactured by Refine Tec Ltd. as a main agent and 27-772 as a curing agent. The specimen is cut with a cutting machine parallel to the thickness direction at a place at which the thicknesses are supposed to be observed to expose a cross section, and the cross section is polished using an abrasive paper with a grit regulated by JIS R 6252 or 6253 (for example, grit 280, grit 400, or grit 600), thereby producing an observation surface. In the case of using an abrasive material, the cross section is polished using a diamond paste with an appropriate grading or a similar paste to produce an observation surface. In addition, the surface of the specimen may be made smooth enough to withstand the observation by carrying out buffing as necessary.

A visual field is selected such that the size of the visual field reaches 300 μm using a microscope that includes an appropriate lighting system for imparting optimal image contrast and is capable of measurement with an accuracy of 1 μm (for example, BX51 manufactured by Olympus Corporation or the like). The size of the visual field may be changed such that each thickness can be confirmed (for example, when the thickness of the CFRP layer 12 is 1 mm, the size of the visual field may be changed to a size in which the thickness can be confirmed). For example, at the time of measuring the thickness of the resin coating layer 13, the inside of the observation visual field is equally divided into four parts, the thickness of the resin coating layer 13 is measured in the widthwise central portion at each fraction point, and the average thickness thereof is regarded as the thickness at the corresponding visual field. As the observation visual field, five visual fields are selected at different places, the inside of each observation visual field is equally divided into four parts, the thickness is measured at each fraction point, and the average value is calculated. Observation visual fields adjacent to each other are preferably selected to be 3 cm or more apart from each other. A value obtained by further averaging the average values of individual groups of five places is regarded as the thickness of the resin coating layer 13. In addition, the thickness of the metal member 11 or the CFRP layer 12 also may be measured in the same manner as in the measurement of the thickness of the resin coating layer 13.

1.2. Modification Examples

Next, modification examples of the metal-carbon fiber reinforced resin material composite 1 according to the above-described embodiment will be described. Individual modification examples to be described below may be applied to the above-described embodiment of the present invention singly or may be applied to the above-described embodiment of the present invention in combination. In addition, each modification example may be applied in place of the configuration described in the above-described embodiment of the present invention or may be additively applied to the configuration described in the above-described embodiment of the present invention.

FIG. 2 to FIG. 7 are cross-sectional schematic views showing metal-carbon fiber reinforced resin material composites according to the modification examples of the present invention, respectively.

First Modification Example

Figure 2:
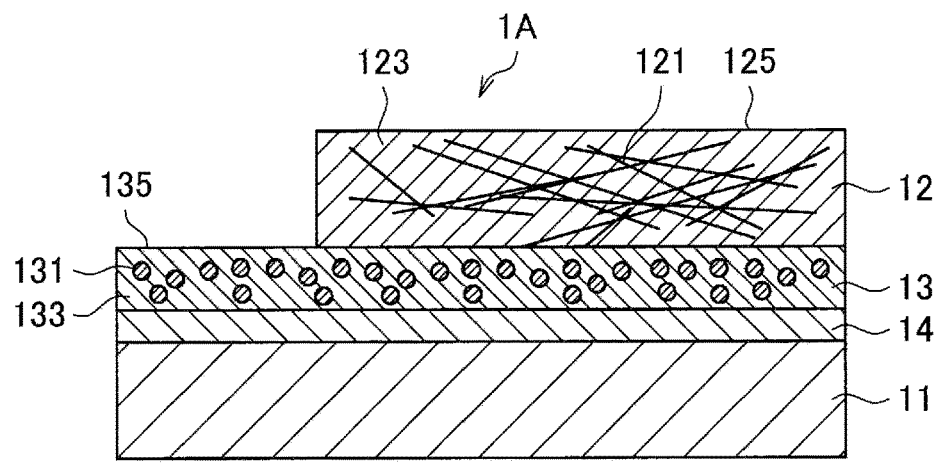
FIG. 2 is a cross-sectional schematic view of a metal-carbon fiber reinforced resin material composite according to a modification example of the present invention in a lamination direction.
Figure 3:
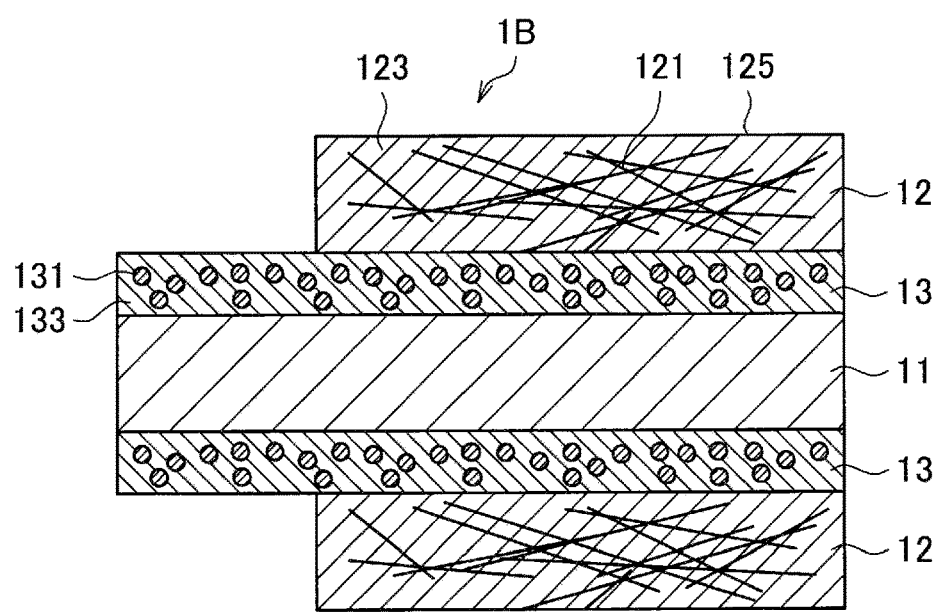
FIG. 3 is a cross-sectional schematic view of a metal-carbon fiber reinforced resin material composite according to another modification example of the present invention in a lamination direction.
Figure 4:
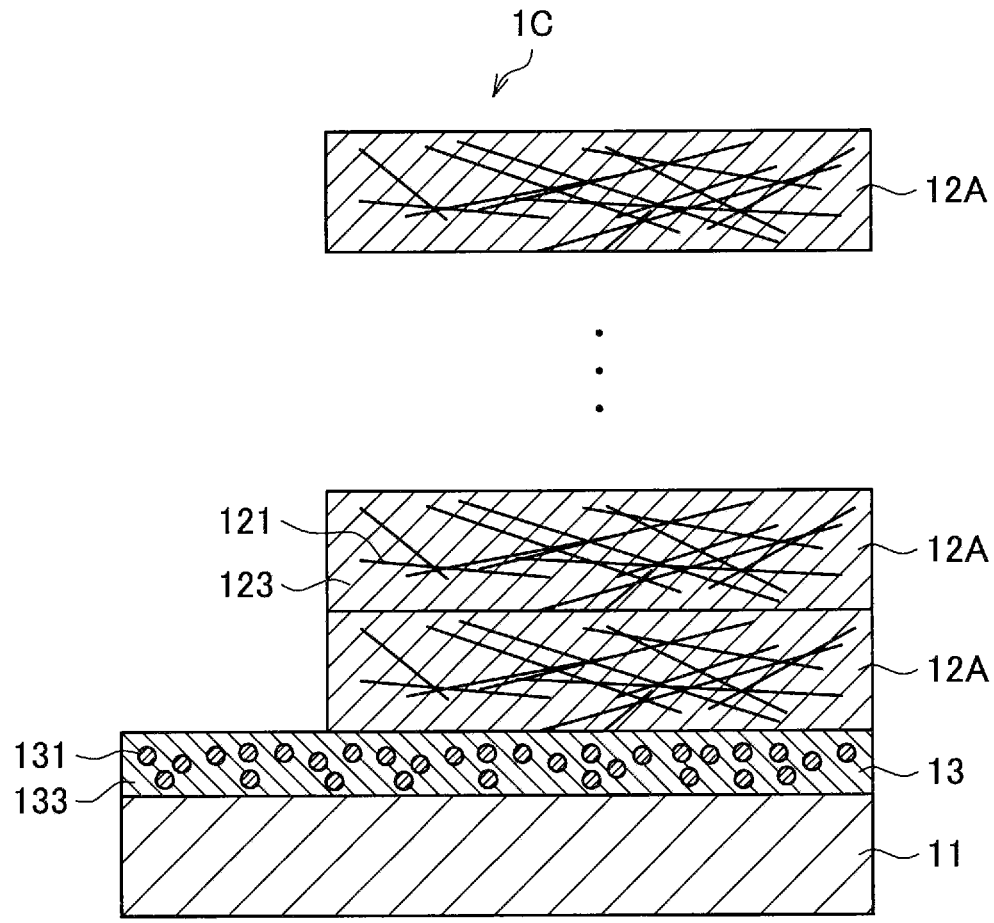
FIG. 4 is a cross-sectional schematic view of a metal-carbon fiber reinforced resin material composite according to another modification example of the present invention in a lamination direction.
Figure 5:
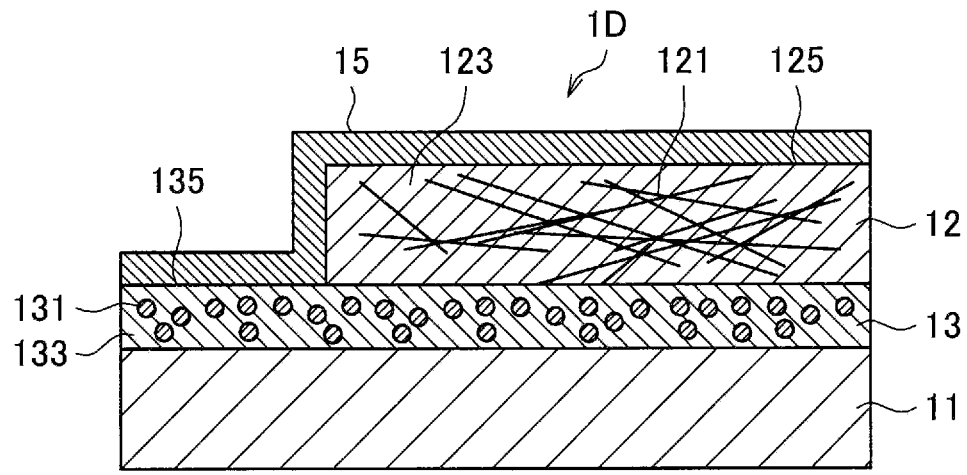
FIG. 5 is a cross-sectional schematic view of a metal-carbon fiber reinforced resin material composite according to another modification example of the present invention in a lamination direction.
Figure 6:
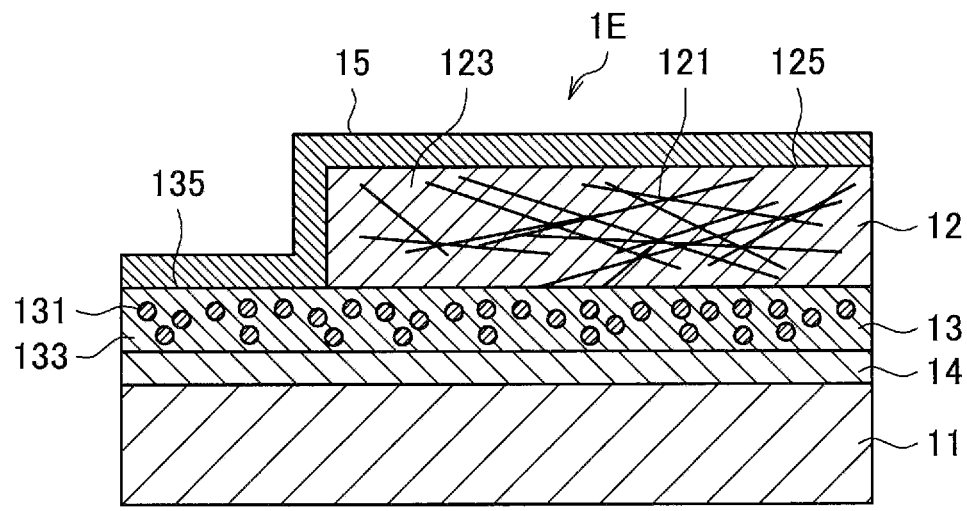
FIG. 6 is a cross-sectional schematic view of a metal-carbon fiber reinforced resin material composite according to another modification example of the present invention in a lamination direction.
Figure 7:
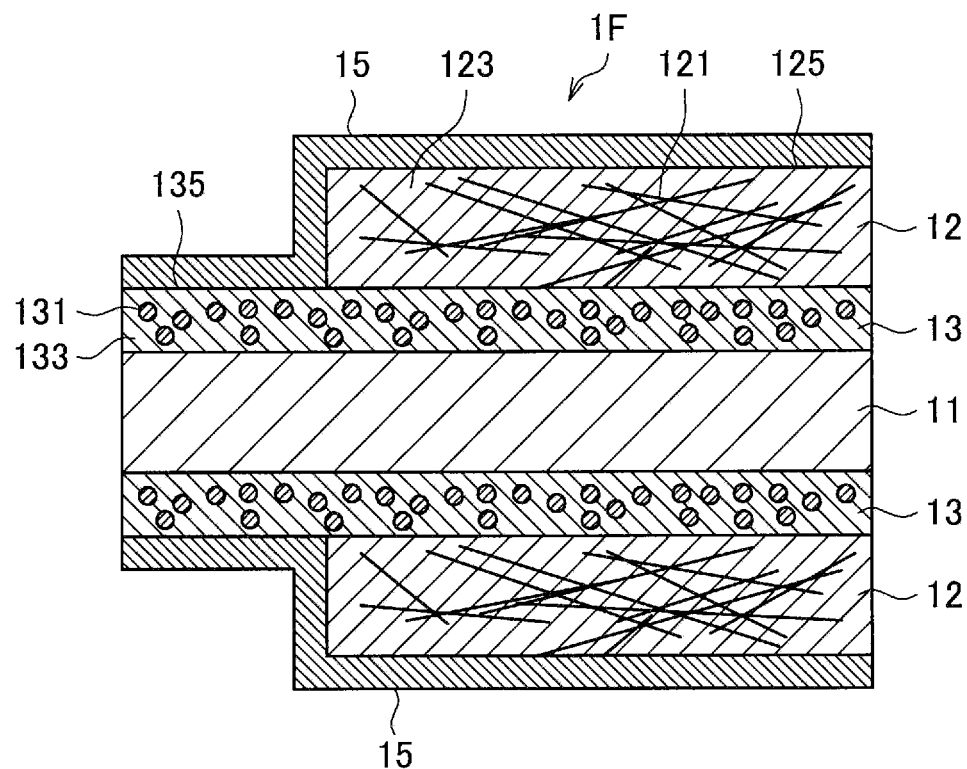
FIG. 7 is a cross-sectional schematic view of a metal-carbon fiber reinforced resin material composite according to another modification example of the present invention in a lamination direction.

In the above-described embodiment, the metal-CFRP composite 1 has been described to be made up of the metal member 11, the CFRP layer 12, and the resin coating layer 13, but the present invention is not limited thereto. The metal-CFRP composite 1 according to the present invention may have an additional layer disposed between the individual configuration layers or on the surface thereof. For example, as shown in FIG. 2, a metal-CFRP composite TA according to the modification example may have a chemical conversion layer 14 disposed between the resin coating layer 13 and the metal member 11. When such a chemical conversion layer 14 is disposed between the metal member 11 and the resin coating layer 13, the corrosion resistance of the metal member 11 improves, and the adhesiveness between the metal member 11 and the resin coating layer 13 of the metal-CFRP composite 1A improves.

Such a chemical conversion layer 14 is not particularly limited, but is preferably a chemical conversion layer containing Cr, P, Si, and/or Zr. In such a case, it is possible to more significantly obtain the above-described effects of improvement in corrosion resistance and adhesiveness.

Such a chemical conversion layer 14 may be an inorganic chemical conversion layer or inorganic-organic mixture chemical conversion layer in which Cr, P, Si, and/or Zr are polymerized through C or Co to form a network or may be a chemical conversion layer in which a coating obtained by adding a compound made up of Cr, P, Si, and/or Zr to a binder such as a resin is applied and dried. In a chemical conversion layer, another ordinarily well-known rust-preventing component, for example, a vanacid acid-based rust-preventing component, a titanic acid-based rust-preventing component, a phosphoric acid-based rust preventing component, or the like may be added thereto as necessary. The chemical conversion treatment may be a reaction-type chemical conversion treatment in which a coating is precipitated from a reaction with a metal on the surface of a metal material during the treatment or may be a chemical conversion treatment in which a treatment liquid in a wet state is applied, dried, and cured. The chemical conversion treatment can be appropriately selected as necessary.

In this case, the chemical conversion layer 14 is allowed to contain a total of 10 $mg/m^2$ or more and 500 $mg/m^2$ or less of Cr, P, Si, and/or Zr and to preferably contain 30 $g/m^2$ or more and 300 $g/m^2$ or less of Cr, P, Si, and/or Zr. In such a case, it is possible to make the corrosion resistance superior and to make the adhesiveness between the metal member 11 and the resin coating layer 13 sufficiently excellent.

Second Modification Example

In addition, in the above-described embodiment, the CFRP layer 12 and the resin coating layer 13 have been described to be disposed on one surface of the metal member 11, but the present invention is not limited thereto. For example, like a metal-CFRP composite 1B shown in FIG. 3, the CFRP layers 12 and the resin coating layers 13 may be disposed on both surfaces of the metal member 11. In addition, in this case, the configurations of the CFRP layers 12 and the configurations of the resin coating layers 13 may be different from each other or identical to each other.

Third Modification Example

In addition, the CFRP layer is not limited to the above-described embodiment, and a plurality of CFRP layers may be provided. For example, like a metal-CFRP composite 1C shown in FIG. 4, the number of the CFRP layers 12A is not limited to one, but may be two or more. In a case where the plurality of CFRP layers 12A is provided, the number n of the CFRP layers 12A may be appropriately set depending on the intended use. In a case where the plurality of CFRP layers 12A is provided, the CFRP layers 12A may have the same configuration or may have different configurations. That is, the kinds of the resins for the matrix resins 123, the kinds or amount rates of the carbon fiber materials 121, and the like that configure the CFRP layers 12A may vary with the layers.

Fourth Modification Example

In addition, in the above-described embodiment, the metal-CFRP composite 1 on which electrodeposition coating is not carried out has been described, but the present invention is not limited thereto. For example, like metal-CFRP composites 1D, 1E, and 1F shown in FIGS. 5 to 7, an electrodeposition-coated coating 15 may be formed on the CFRP layer 12 and the resin coating layer 13.

Fifth Modification Example

In the above-described embodiment, a case where the metal-CFRP composite 1 has a sheet shape has been schematically described, but the present invention is not limited thereto, and it is needless to say that the metal-CFRP composite of the present invention may be formed.

2. Method for Manufacturing Metal-Carbon Fiber Reinforced Resin Material Composite Next, a method for manufacturing the metal-carbon fiber reinforced resin material composite according to the embodiment of the present invention will be described. A method for manufacturing a metal-carbon fiber reinforced resin material composite according to an embodiment of the present invention has a step of thermally compressing a metal member provided on at least a part of a surface of a resin coating layer containing conductive particles and a binder resin and a carbon fiber reinforced resin material through the resin coating layer. In addition, the method for manufacturing a metal-carbon fiber reinforced resin material composite may have, before and after the thermal compression step, a step of forming a metal member or a laminate in which the metal member and a carbon fiber reinforced resin material are laminated together. Hereinafter, the method for manufacturing the metal-carbon fiber reinforced resin material composite according to the embodiment of the present invention will be described in detail with an assumption that forming is carried out, but it is needless to say that forming may not be carried out.

2.1. First Embodiment

Figure 8A:
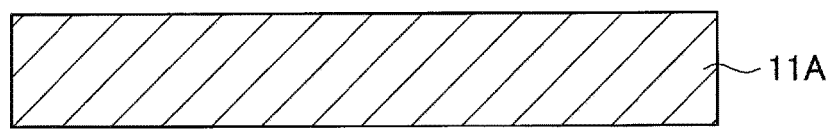
FIGS. 8A-8C are schematic views showing a method for manufacturing a metal-CFRP composite according to a first embodiment of the present invention.
Figure 8B:
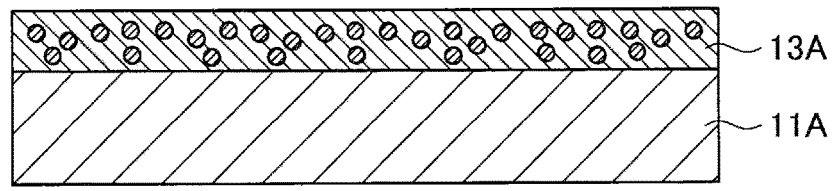
Figure 8C:
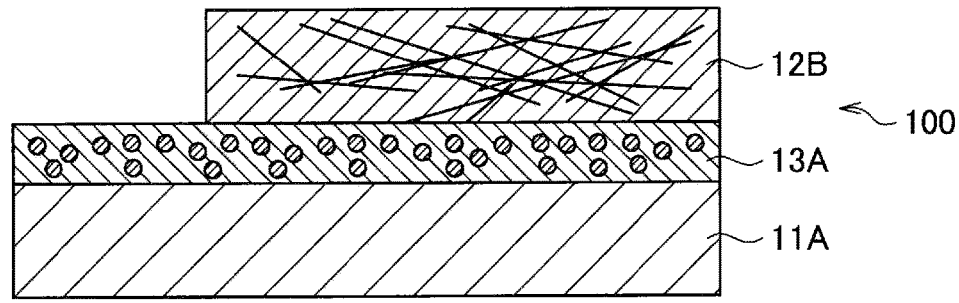
Figure 9:
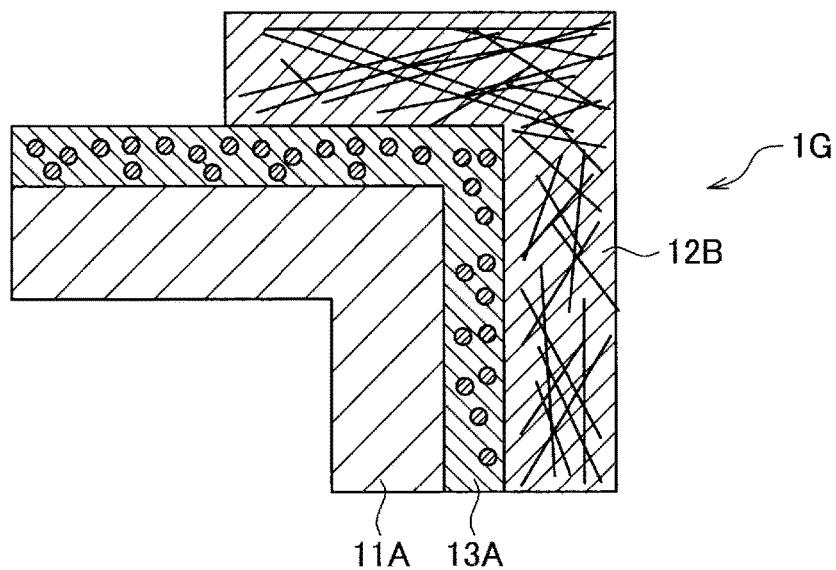
FIG. 9 is a schematic view showing the method for manufacturing a metal-CFRP composite according to the first embodiment of the present invention.

FIG. 8 and FIG. 9 are schematic views showing a method for manufacturing a metal-CFRP composite according to a first embodiment of the present invention. The method for manufacturing a metal-CFRP composite 1G according to the first embodiment has at least a thermal compression step A of thermally compressing a metal member 11A provided with a resin coating layer 13A on at least a part of the surface and a carbon fiber reinforced resin material (a CFRP or a pre-preg for forming the CFRP) through the resin coating layer 13A to obtain a laminate 100. In addition, the method for manufacturing the metal-CFRP composite 1G according to the present embodiment has a step A of forming the laminate 100.

Furthermore, in the present embodiment, the method may include a resin coating layer formation step of forming the resin coating layer 13A on at least a part of the surface of the metal member 11A, an electrodeposition coating step, a pretreatment step, and/or a post step as necessary. Hereinafter, each step will be described.

(Pretreatment Step)

First, the metal member 11A is prepared (FIG. 8A). Ordinarily well-known degreasing is preferably carried out on the metal member 11A as necessary. As the degreasing method, it is also possible to use an ordinarily well-known method such as a method in which the metal member 11A is rubbed with a solvent, water washing, a method in which the metal member 11A is washed with an aqueous solution containing a surfactant or a washing agent, a method in which an oil component is volatilized by heating, or alkaline degreasing. Alkaline degreasing is industrially ordinary and is preferable due to the strong degreasing effect. In addition, it is more preferable to carry out a demolding treatment on a mold to be used or to remove a substance attached to the surface of the metal member 11A (dust removal). This pretreatment improves the adhesiveness between the metal member 11A and the resin coating layer 13A.

(Coating Formation Step)

Next, the resin coating layer 13A is formed on a surface of the metal member 11A (FIG. 8B). The resin coating layer 13A is formed by applying a resin coating layer material composition containing the material of the resin coating layer 13A to the surface of the metal member 11A and drying and baking the resin coating layer material composition. The resin coating layer material composition may be a liquid-form, slurry-form, or powder-form composition. A sheet prepared as the resin coating layer material composition that has been formed in a sheet shape in advance may be attached to the metal member 11A by thermal compression or the like.

In addition, the application method is also not particularly limited. In the case of a sheet-like resin coating layer material composition, regarding the sticking method, the resin coating layer material composition can be stuck by an ordinarily well-known method such as manual sticking or sticking with a robot. In the case of a viscous liquid, it is possible to apply the viscous liquid by an ordinarily well-known method such as application in which the viscous liquid is ejected from a slit nozzle or a circular nozzle, brush coating, plate coating, or spatula coating. For a resin coating layer material composition dissolved in a solvent, it is possible to use an ordinarily well-known method, for example, brush coating, spray coating, bar coater, ejection coating from nozzles with a variety of shapes, die coating, curtain coating, roll coating, screen printing, inkjet coating, or the like. In the case of a powder-form resin coating layer material composition, it is possible to adopt a well-known method such as powder coating. Particularly, in the resin coating layer 13A formed by powder coating, the coating layer material composition is fine particles, which makes the resin component easily dissolve, and an appropriate number of pores are present in the resin coating layer 13A, which makes it easy to remove voids. In addition, since the resin component that configures the resin coating layer 13A favorably wets the surface of the metal member 11A at the time of thermally compressing the CFRP or the pre-preg for forming the CFRP, a degassing step such as the application of varnish is not required. The resin coating layer 13A may be applied to the entire surface of the metal member 11A or may be applied only to a place where the carbon fiber reinforced resin material (CFRP) is stuck.

Before the application of the resin coating layer 13A, the chemical conversion layer 14 may be provided on the metal member 11A. As the method for providing the chemical conversion layer 14, it is possible to use an ordinarily well-known treatment method, for example, an immersion drying method, an immersion, water washing, and drying method, a spraying, water washing, and drying method, an application and drying method, an application and drying curing method, or the like. As the application method, it is possible to apply the chemical conversion layer 14 by an ordinarily well-known method such as immersion, brush coating, spraying, roll coating, bar coating, or blade coating.

In addition, drying and baking can be carried out by, for example, a heating treatment or the like. The heating conditions are not particularly limited, and the electrodeposition paint can be heated, for example, for 10 seconds or longer and 30 minutes or shorter at a temperature of 100° C. or higher and 250° C. or lower. A normal temperature-curable resin coating layer material composition may be used. In this case, the resin coating layer material composition may be a one-liquid type resin coating layer material composition in a state where a main resin and a curing agent have been mixed together. The resin coating layer material composition may be a two-liquid curable resin coating layer material composition in which a main resin and a curing agent are separately mixed together immediately before being applied or may be a three or more-liquid type resin coating layer material composition in which a main resin, a curing agent, and another additive or the like are separately mixed together immediately before being applied.

The resin coating layer 13A may be applied or stuck at the time of disposing the pre-preg for forming the CFRP or the CFRP, which serves as the CFRP layer 12B, and the metal member 11A so as to overlap each other and be cured at the time of thermally compressing this laminate as described below. Alternatively, the pre-preg for forming the CFRP or the CFRP may be disposed so as to overlap a cured laminate obtained by applying or sticking the resin coating layer 13A to the metal member 11A in advance and be thermally compressed as described below.

(Thermal Compression Step A)

Next, the metal member 11A and the carbon fiber reinforced resin material (the CFRP or the pre-preg for forming the CFRP) are thermally compressed through the resin coating layer 13A to obtain the laminate 100 (FIG. 8C). Specifically, a laminate obtained by laminating the pre-preg for forming the CFRP (or the CFRP), which serves as the CFRP layer 12B, on the resin coating layer 13A is installed in a pressurization machine and is pressurized while being heated. Therefore, the laminate 100 in which the metal member 11A, the resin coating layer 13A, and the CFRP layer 12B are laminated in this order is manufactured.

Specifically, first, the metal member 11A and the pre-preg for forming the CFRP or the CFRP are disposed so as to overlap each other through the resin coating layer 13A, thereby obtaining a laminate. In the case of using the CFRP, the attachment surface of CFRP preferably has been, for example, roughened by a blast treatment or the like or activated by a plasma treatment, a corona treatment, or the like. Next, this laminate is heated and pressurized (thermally compressed), thereby obtaining the laminate 100.

Here, the thermal compression conditions in the present step are as described below.

The thermal compression temperature is not particularly limited, but is, for example, in a range of 100° C. or higher and 400° C. or lower, preferably 150° C. or higher and 300° C. or lower, more preferably in a range of 160° C. or higher and 270° C. or lower, and still more preferably in a range of 180° C. or higher and 250° C. or lower. Within such a temperature range, a temperature of the melting point or higher is more preferable when the resin is a crystalline resin, and a temperature of Tg+150° C. or higher is more preferable when the resin is a non-crystalline resin. When the thermal compression temperature is equal to or lower than the above-described upper limit temperature, it is possible to suppress the application of excess heat and to prevent the decomposition of the resin. In addition, when the thermal compression temperature is equal to or higher than the above-described lower limit temperature, it is possible to make the melt viscosity of the resin appropriate and to make the attachment property to the CFRP and the impregnation property with respect to a CFRP base material excellent.

The pressure at the time of the thermal compression is, for example, preferably 3 MPa or higher and more preferably within a range of 3 MPa or higher and 5 MPa or lower. When the pressure is 5 MPa or lower, the application of an excess pressure is prevented, and it is possible to more reliably prevent the occurrence of deformation or damage. In addition, when the pressure is 3 MPa or higher, it is possible to improve the impregnation property with respect to the CFRP base material.

When the thermal compression time is at least three minutes, it is possible to sufficiently heat and compress the CFRP layer 12, and the thermal compression time is preferably within a range of five minutes or longer and 20 minutes or shorter.

[Additive Heating Step]

In the case of using a crosslinkable adhesive resin composition containing the crosslinking curable resin (B) and the crosslinking agent (C) in the phenoxy resin (A) as an adhesive resin composition for forming the resin coating layer 13A or a raw material resin for forming the matrix resin 123, the method may further include an additive heating step.

In the case of using the crosslinkable adhesive resin composition, it is possible to form the resin coating layer 13A with a cured substance (solidified substance) in a first cured state where the cured substance is solidified, but is not yet crosslinked (cured) in the thermal compression step. In addition, in the case of using the same resin or the same kind of resin as the crosslinkable adhesive resin composition as a raw material resin for the matrix resin of the pre-preg for forming the CFRP, which serves as the CFRP layer 12, it is possible to form the CFRP layer 12B containing the matrix resin 123 made of a cured substance (solidified substance) in the first cured state.

As described above, it is possible to produce an intermediate (preform) of the metal-CFRP composite 1 in which the metal member 11A, the uncured resin coating layer 13A, and the CFRP layer 12B are laminated and integrated together through the thermal compression step. In this intermediate, as necessary, it is also possible to use a layer in which the matrix resin 123 is a cured substance (solidified substance) in the first cured state as the CFRP layer 12B. In addition, when an additive heating step is further carried out after the thermal compression step on this intermediate, at least the resin coating layer 13A made of the cured substance (solidified substance) in the first cured state is post-cured, the resin is cross-linked and cured, and can be changed to a cured substance (cross-linked cured substance) in the second cured state. Preferably, even the CFRP layer 12B is post-cured, whereby the matrix resin 123 made of the cured substance (solidified substance) in the first cured state is cross-linked and cured and can be changed to a cured substance (cross-linked cured substance) in the second cured state.

The additive heating step for post curing is preferably carried out, for example, at a temperature in a range of 200° C. or higher and 250° C. or lower for a time of approximately 30 minutes to 60 minutes. Instead of post curing, the heat history in a post step such as coating may be used.

As described above, when the crosslinkable adhesive resin composition is used, the Tg significantly improves after crosslinking and curing compared with a case where the resin composition contains the phenoxy resin (A) alone. Therefore, the Tg changes before and after the additive heating step carried out on the above-described intermediate, that is, in a process in which the resin changes from the cured substance (solidified substance) in the first cured state to the cured substance (cross-linked cured substance) in the second cured state. Specifically, since the Tg of the resin before the crosslinking of the intermediate is, for example, 150° C. or lower, but the Tg of the cross-linked resin after the additive heating step improves to, for example, 160° C. or higher, preferably, in a range of 170° C. or higher and 220° C. or lower, the heat resistance can be significantly enhanced.

In a case where the forming of the laminate 100 is not required, the laminate 100 may be used as it is as a metal-CFRP composite without carrying out the following forming step.

(Forming Step A)

Next, the laminate 100 is formed (FIG. 9D), thereby obtaining a metal-CFRP composite 1G. The method for forming the laminate 100 is not particularly limited, and it is possible to adopt a variety of press processes, for example, shearing, bending, drawing, and forging.

These press processes may be carried out at normal temperature, but are preferably hot-press since the CFRP is not easily detached from the metal member 11A during the process. The temperature of the hot-press is preferably the same as the temperature of the thermal compression step.

In the present embodiment, the thermal compression step A and the forming step A (the formation of the metal-CFRP composite 1D) may be carried out at the same time. That is, the laminate may be formed simultaneously while the metal member 11A and the carbon fiber reinforced resin material (the CFRP or the pre-preg for forming the CFRP) are thermally compressed through the resin coating layer 13A in a pressurization forming machine.

(Electrodeposition Coating Step)

In addition, an electrodeposition-coated coating may be formed on the resin coating layer 13A and/or the CFRP layer 12B of the obtained metal-CFRP composite 1G as necessary by electrodeposition coating. When electrodeposition coating is carried out on the CFRP layer 12B, the corrosion resistance is superior, which is preferable. The metal-CFRP composite 1G is excellent in terms of electrodeposition coatability, and an electrodeposition-coated coating having a relatively uniform film thickness is formed. The conditions of the electrodeposition coating in the present step are not particularly limited, and it is possible to carry out the electrodeposition coating by adopting a well-known paint and well-known conditions. As the paint for the electrodeposition coating, it is possible to use a commercially available paint. In addition, before the electrodeposition coating, it is possible to carry out degreasing, surface adjustment, or a zinc phosphate treatment or zirconia treatment, which is ordinarily well known, as a pretreatment. As a degreasing agent, a surface adjustment agent, a zinc phosphate treatment agent, or a zirconia treatment agent, a commercially available agent may be used.

(Post Step)

In the post step on the metal-CFRP composite 1D, in addition to painting, punching in order for mechanical joining with other members with a bolt, rivet fastening, or the like, the application of an adhesive for adhesive joining, or the like is carried out as necessary.

2.2. Second Embodiment

Figure 10A:
FIGS. 10A-10C are schematic views showing a method for manufacturing a metal-CFRP composite according to a second embodiment of the present invention.
Figure 10B:
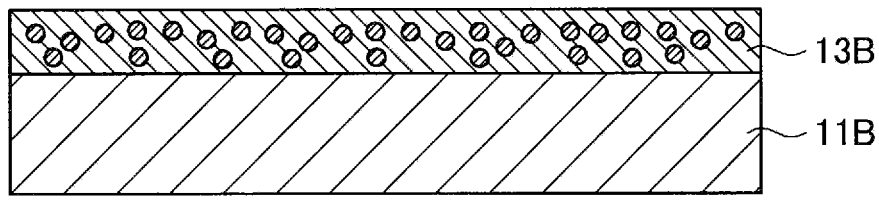
Figure 10C:
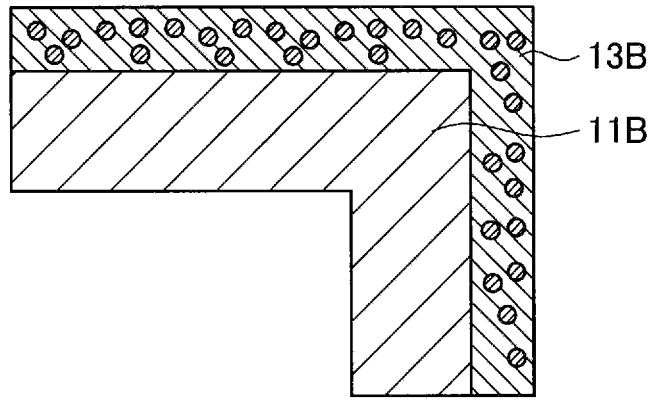
Figure 11A:
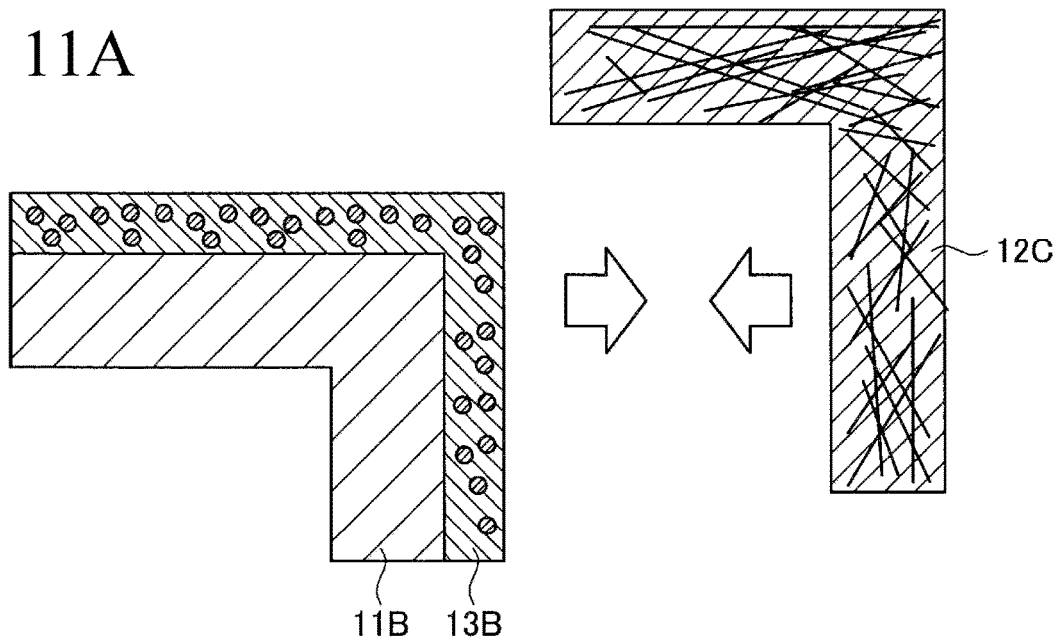
FIGS. 11A-11B are schematic views showing the method for manufacturing a metal-CFRP composite according to the second embodiment of the present invention.
Figure 11B:
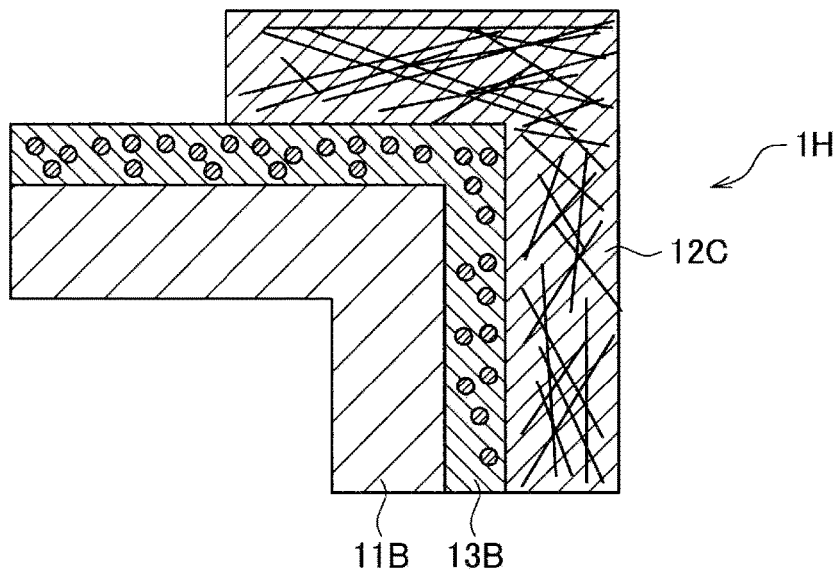

FIG. 10 and FIG. 11 are schematic views showing a method for manufacturing a metal-CFRP composite according to a second embodiment of the present invention. The method for manufacturing a metal-CFRP composite 1H according to the second embodiment has a forming step B of forming a metal member 11B provided on at least a part of a surface of a resin coating layer 13B and a thermal compression step B of thermally compressing the metal member 11B and a carbon fiber reinforced resin material through the resin coating layer 13B to obtain the metal-CFRP composite 1H.

That is, the second embodiment is different from the first embodiment in terms of the fact that a laminate of the metal member 11B and the resin coating layer 13B is formed before the formation of a CFRP layer 12C. In the case of the first embodiment, there is a concern that, depending on the matrix resin of the CFRP, a crack may be generated in the resin or the CFRP may be detached from the metal member 11A. In addition, the hot-press is required in order to prevent the generation of a crack or the detachment of the CFRP. In addition, in the first embodiment, in a case where the thickness of the CFRP is thick, there is a need to design an appropriate press mold after sticking. When the metal member 11B is formed before the formation of the CFRP layer 12C as described above, it is possible to solve the above-described disadvantages that may be caused in the first embodiment and to use a press mold that is ordinarily used.

Each condition that is used in the second embodiment is basically the same as in the first embodiment and thus will not be described again.

Specifically, the metal member 11B is prepared (FIG. 10A), and the resin coating layer 13B is formed on the surface of the metal member 11B (FIG. 10B). After that, forming is carried out on the metal member 11B on which the resin coating layer 13B has been formed (FIG. 10C). Finally, a carbon fiber reinforced resin material is thermally compressed onto the formed metal member 11B through the resin coating layer 13B, thereby obtaining the metal-CFRP composite 1H (FIGS. 11D and 11E). In addition, the electrodeposition coating step and/or the post step are carried out as necessary.

Hitherto, the method for manufacturing a metal-CFRP composite according to the present embodiment has been described. The method for manufacturing the metal-CFRP composite according to the present invention is not limited to the above-described embodiments.

EXAMPLES

Hereinafter, the present invention will be described in more detail using examples. The examples to be described below are simply an example of the present invention and do not limit the present invention.

1. Manufacturing of Metal-CFRP Composite (Preparation of Metal Sheet)

Steel having components of C: 0.131 mass %, Si: 1.19 mass %, Mn: 1.92 mass %, P: 0.009 mass %, S: 0.0025 mass %, Al: 0.027 mass %, and N: 0.0032 mass % with a remainder of Fe was hot-rolled, pickled, and cold-rolled, thereby obtaining 0.1 mm-thick cold-rolled steel sheets. Next, the produced cold-rolled steel sheets were annealed with a continuous annealing device under conditions under which the highest sheet temperature reached became 820° C. The gas atmosphere in an annealing furnace during the annealing step was set to a $N_2$ atmosphere containing 1.0 vol % of $H_2$. The produced cold-rolled steel sheet will be referred to as "CR".

In addition, additional steel sheets were prepared by annealing the produced cold-rolled steel sheets in an annealing step with a continuous hot-dip plating device having an annealing step under conditions under which the highest sheet temperature reached became 820° C. and then carrying out hot-dip galvanization thereon in a plating step. The gas atmosphere in an annealing furnace during the annealing step was set to a $N_2$ atmosphere containing 1.0 vol % of $H_2$. As the components of plating baths in the plating step, four types of components such as Zn-0.2% Al (referred to as "GI"), Zn-0.09% Al (referred to as "GA"), Zn-1.5% Al-1.5% Mg (referred to as "Zn—Al—Mg"), and Zn-11% Al-3% Mg-0.2% Mg (referred to as "Zn—Al—Mg—Si") were used. For steel sheets for which a hot-dip plating bath of the Zn-0.09% Al plate was used, the steel sheets were immersed in the hot-dip plating bath, gas wiping was carried out by blowing $N_2$ gas from a slit nozzle while pulling the steel sheets out of the plating bath to adjust the amounts of the plate attached, the steel sheets were heated at a sheet temperature of 480° C. with an induction heater to alloy the steel sheets, and Fe in the steel sheets was diffused into the plating layers.

The tensile strengths of the produced metal sheets were measured and all found out to be 980 MPa.

In addition, the amounts of the plates attached to the plated steel sheets were set to 45 $g/m^2$ for GA and 60 $g/m^2$ for platings other than GA.

Additionally, in addition to the above-described steel sheets, as metal sheets other than the steel sheets, aluminum alloy sheets (hereinafter, referred to as "Al sheets") and magnesium alloy sheets (hereinafter, referred to as "Mg alloy sheets") were also separately prepared.

(Pretreatment Step)

The produced metal sheets were degreased with an alkaline degreasing agent "FINE CLEANER E6404" manufactured by Nihon Parkerizing Co., Ltd.

(Chemical Conversion Treatment Step)

An aqueous solution to which γ-aminopropyltriethoxysilane (2.5 g/L), water-dispersible silica "SNOWTEX N" manufactured by Nissan Chemical Corporation (1 g/L), and a water-soluble acrylic resin (polyacrylic acid of a reagent)

(3 g/L) were added was applied onto the degreased metal sheets with a bar coater and dried with a hot-air oven under conditions under which the sheet temperature reached became 150° C. In addition, each of a zirconium ammonium carbonate aqueous solution (3 g/L) and a chromate treatment liquid "ZM-1300AN" manufactured by Nihon Parkerizing Co., Ltd. was also applied with a bar coater in the same manner and dried with a hot-air oven under conditions under which the sheet temperature reached became 150° C. Hereinafter, a metal sheet to which the aqueous solution containing water-dispersible silica was applied will be referred to as "Si-based treatment" (or simply "Si-based"), a metal sheet to which the zirconium ammonium carbonate aqueous solution was applied will be referred to as "Zr-based treatment" (or simply "Zr-based"), and a metal sheet treated with the chromate treatment liquid will be referred to as "Cr-based treatment" (or simply "Cr-based").

In addition, the amount of each treatment liquid attached was set to 30 mg/m². The amount of each treatment liquid attached was calculated by calculating the amount of each treatment liquid that was applied to the entire surface of a metal sheet and remained in a wet state before being dried from [mass of metal sheet after application]-[mass of metal sheet before application], calculating the mass of each of Cr, Si, and Zr that was contained in the amount of the treatment liquid that was applied and remained in a wet state, and dividing this mass by the area of the metal sheet. In addition, the amount of the treatment liquid attached can also be obtained as described below. Chemical conversion-treated metal sheets (completely dried) having five different amounts attached are produced while calculating the amounts of the treatment liquid attached by the above-described method and measured using fluorescent X-rays, a calibration curve is derived from the relationship between the obtained detection intensities and the calculated amounts attached, and the amount attached is obtained from the calibration curve.

(Resin Coating Layer Formation Step)

As binder resins, an epoxy resin "jER® 828" manufactured by Mitsubishi Chemical Corporation, a urethane-modified epoxy resin "EPOKEY® 828-30CX" manufactured by Mitsui Chemicals, Inc., and a polyester resin "VYLON® 300" manufactured by Toyobo Co., Ltd. were prepared. In addition, as curing agents, an amine "MXDA (meta-xylenediamine)" manufactured by Mitsubishi Gas Chemical Company, Inc., "1,12-dodecamethylenediamine" manufactured by Ube Industries, Ltd., melamine "U-VAN® 20SB" manufactured by Mitsui Chemicals, Inc., an aqueous urethane resin "SUPERFLEX® 150" manufactured by DKS Co., Ltd., and a melamine resin "CYMEL® 325" manufactured by Solvay were prepared.

Next, a resin and a curing agent are mixed together, thereby producing the following coating resin samples.

Epoxy resin-A: "1,12-Dodecamethylenediamine" manufactured by Ube Industries, Ltd. (30 parts by mass) was added to "jER® 828" manufactured by Mitsubishi Chemical Corporation (100 parts by mass) and mixed together.

Epoxy resin-B: "MXDA (meta-xylenediamine)" manufactured by Mitsubishi Gas Chemical Company, Inc. (30 parts by mass) was added to "jER® 828" manufactured by Mitsubishi Chemical Corporation (100 parts by mass) and mixed together.

Epoxy resin-C: "U-VAN® 20SB" manufactured by Mitsui Chemicals, Inc. (20 parts by mass in terms of the solid content) was added to "EPOKEY® 802-30CX" manufactured by Mitsui Chemicals, Inc. (100 parts by mass in terms of the solid content) and mixed together.

Polyester/melamine resin: "U-VAN® 20SB" manufactured by Mitsui Chemicals, Inc. (20 parts by mass in terms of the solid content) was added to a substance obtained by dissolving "VYLON® 300" (30 mass %) manufactured by Toyobo Co., Ltd. in cyclohexanone, which was a solvent, (100 parts by mass in terms of the solid content) and mixed together.

Polyester/epoxy resin: "U-VAN® 20SB" manufactured by Mitsui Chemicals, Inc. (20 parts by mass in terms of the solid content) and a BPA-type epoxy resin "YD-013" manufactured by Nippon Steel Chemical & Material Co., Ltd. (5 parts by mass) were added to a substance obtained by dissolving "VYLON® 300" (30 mass %) manufactured by Toyobo Co., Ltd. in cyclohexanone, which was a solvent, (100 parts by mass in terms of the solid content) and mixed together.

Urethane/melamine resin: A melamine resin "CYMEL® 325" manufactured by Solvay (20 parts by mass in terms of the solid content) was added to an aqueous urethane resin "SUPERFLEX® 150" manufactured by DKS Co., Ltd. (80 parts by mass in terms of the solid content) and mixed together.

Furthermore, particles described below were mixed into the produced resins, thereby producing resin coating application liquids. The amounts of the particles added were adjusted to become a volume rate shown in Table 1 by obtaining the mass rate in the coating of the solid content of the particles that were added to the resin coating application liquid and calculating the volume rate from the specific gravity of the solid content of the coating resin and the specific gravity of the particles. As the specific gravity, the catalog value or document value of each substance was used.

Vanadium boride: "VB$_2$—O" manufactured by Japan New Metals Co., Ltd. was classified with a sieve, and particles having an average particle size of 3.1 μm were used. Hereinafter, this vanadium boride will be referred to as "VB2".

Al-doped zinc oxide: Conductive zinc oxide (Al-doped ZnO) "23-K" manufactured by Hakusui Tech. having primary particle sizes of 120 to 250 nm (catalog values) was used. Hereinafter, this Al-doped zinc oxide will be referred to as "Al—ZnO".

Metal zinc: Zinc particles of a reagent were classified with a sieve, and particles having an average particle size of 10 μm were used. Hereinafter, this metal zinc will be referred to as "Zn".

Ferrosilicon: Ferrosilicon manufactured by Marubeni Tetsugen Co., Ltd. was pulverized to fine particles with a pulverizer, the particles were classified with a sieve, and particles having an average particle size of 3 μm, 9 μm, 47 μm, or 98 μm were used. Hereinafter, this ferrosilicon will be referred to as "Fe—Si".

Ferromanganese: Ferromanganese manufactured by Marubeni Tetsugen Co., Ltd. was pulverized to fine particles with a pulverizer, the particles were classified with a sieve, and particles having an average particle size of 3.5 μm were used. Hereinafter, this ferromanganese will be referred to as "Fe—Mn".

Zirconium boride: "ZrB$_2$—O" manufactured by Japan New Metals Co., Ltd. was classified with a sieve, and particles having an average particle size of 2 μm were used. Hereinafter, this zirconium boride will be referred to as "ZrB$_2$".

Molybdenum silicide: "MoSi$_2$—F" manufactured by Japan New Metals Co., Ltd. was classified with a sieve, and particles having an average particle size of 3.5 μm were used. Hereinafter, this molybdenum silicide will be referred to as "MoSi$_2$".

Chromium boride: "CrB$_2$—O" manufactured by Japan New Metals Co., Ltd. was classified with a sieve, and particles having an average particle size of 5 μm were used. Hereinafter, this chromium boride will be referred to as "CrB$_2$".

Tungsten silicide: "B$_2$—O" manufactured by Japan New Metals Co., Ltd. was classified with a sieve, and particles having an average particle size of 2 μm were used. Hereinafter, this tungsten silicide will be referred to as "WSi2".

Nickel: A nickel powder of a reagent was classified with a sieve, and particles having an average particle size of 5 μm were used. Hereinafter, this nickel will be referred to as "Ni".

Alumina: Fine particle alumina "A-42-2" manufactured by Showa Denko K.K. having an average particle size (particle size distribution central diameter) of 4.7 μm (catalog value) was used. Hereinafter, this alumina will be referred to as "alumina".

Titanium oxide: "TIPAQUE® CR-95" manufactured by Ishihara Sangyo Kaisha, Ltd. having an average particle size of 0.28 μm (catalog value) was used. Hereinafter, this titanium oxide will be referred to as "TiO2".

Aluminum nitride: An aluminum nitride powder for a filler manufactured by Tokuyama Corporation having a particle size of 1 μm (catalog value) was used. Hereinafter, this aluminum nitride will be referred to as "AlN".

Conductive titanium oxide: Sn-doped titanium oxide "ET-500W" manufactured by Ishihara Sangyo Kaisha, Ltd. having an average particle size of 2 to 3 μm (catalog value) was used. Hereinafter, this conductive titanium oxide will be referred to as "conductive Ti".

The produced coating application liquids are shown in Table 1 with distinguishable indicators of "Coating-1" to "Coating-27". The powder resistivity of the particles in Table 1 refers to the resistance value measured at the time of compressing each powder at 25° C. and 10 MPa using a powder resistance measuring system MCP-PD51 manufactured by Mitsubishi Chemical Analytech Co., Ltd. In addition, the glass transition temperatures of the resin coating layers were measured from substances obtained by drying and curing the coating application liquids in an oven with a 200° C. atmosphere for 20 minutes with an automatic differential scanning calorimeter "DSC-60A" manufactured by Shimadzu Corporation.

TABLE 1

| | Resin | | Conductive particles | | | |
|---|---|---|---|---|---|---|
| | Kind | Glass transition temperature (° C.) | Kind | Particle size: r (μm) | Powder resistivity (Ω · cm) | Amount added (vol %) |
| Coating-1 | Epoxy resin-A | >100 | VB2 | 3.1 | ≤7.0 × 10$^7$ | 30 |
| Coating-2 | Epoxy resin-B | More than 60 and 100 or less | VB2 | 3.1 | ≤7.0 × 10$^7$ | 5 |
| Coating-3 | Epoxy resin-B | More than 60 and 100 or less | VB2 | 3.1 | ≤7.0 × 10$^7$ | 10 |
| Coating-4 | Epoxy resin-B | More than 60 and 100 or less | VB2 | 3.1 | ≤7.0 × 10$^7$ | 30 |
| Coating-5 | Epoxy resin-B | More than 60 and 100 or less | VB2 | 3.1 | ≤7.0 × 10$^7$ | 50 |
| Coating-6 | Epoxy resin-B | More than 60 and 100 or less | Al—ZnO | Primary particle size: >0.01 Secondary particle size: <0.1 | ≤7.0 × 10$^7$ | 30 |
| Coating-7 | Epoxy resin-B | More than 60 and 100 or less | Zn | 10 | ≤7.0 × 10$^7$ | 30 |
| Coating-8 | Epoxy resin-B | More than 60 and 100 or less | Fe—Si | 3 | ≤7.0 × 10$^7$ | 30 |
| Coating-9 | Epoxy resin-B | More than 60 and 100 or less | Fe—Si | 9 | ≤7.0 × 10$^7$ | 30 |
| Coating-10 | Epoxy resin-B | More than 60 and 100 or less | Fe—Si | 47 | ≤7.0 × 10$^7$ | 30 |
| Coating-11 | Epoxy resin-B | More than 60 and 100 or less | Fe—Si | 98 | ≤7.0 × 10$^7$ | 30 |
| Coating-12 | Epoxy resin-B | More than 60 and 100 or less | ZrB2 | 2 | ≤7.0 × 10$^7$ | 30 |
| Coating-13 | Epoxy resin-B | More than 60 and 100 or less | MoSi2 | 3.5 | ≤7.0 × 10$^7$ | 30 |
| Coating-14 | Epoxy resin-B | More than 60 and 100 or less | CrB2 | 5 | ≤7.0 × 10$^7$ | 30 |
| Coating-15 | Epoxy resin-B | More than 60 and 100 or less | WSi2 | 2 | ≤7.0 × 10$^7$ | 30 |
| Coating-16 | Epoxy resin-B | More than 60 and 100 or less | Ni | 5 | ≤7.0 × 10$^7$ | 30 |
| Coating-17 | Epoxy resin-B | More than 60 and 100 or less | Conductive Ti | 2 | <7.0 × 10$^7$ | 30 |
| Coating-18 | Epoxy resin-B | More than 60 and 100 or less | TiO2 | 0.28 | >7.0 × 10$^7$ | 30 |
| Coating-19 | Epoxy resin-B | More than 60 and 100 or less | AlN | 2 | >7.0 × 10$^7$ | 30 |
| Coating-20 | Epoxy resin-B | More than 60 and 100 or less | Not added | | | |
| Coating-21 | Epoxy resin-C | More than 35 and 60 or less | VB2 | 3.1 | ≤7.0 × 10$^7$ | 30 |
| Coating-22 | Polyester/ melamine resin | 10 or more and 35 or less | VB2 | 3.1 | ≤7.0 × 10$^7$ | 30 |
| Coating-23 | Polyester resin | 10 or more and 35 or less | Fe—Mn | 3.5 | ≤7.0 × 10$^7$ | 30 |
| Coating-24 | Polyester/ melamine resin | 10 or more and 35 or less | Alumina | 4.7 | ≤7.0 × 10$^7$ | 30 |
| Coating-25 | Polyester/ epoxy resin | 10 or more and 35 or less | VB2 | 3.1 | ≤7.0 × 10$^7$ | 30 |
| Coating-26 | Polyester/ epoxy resin | 10 or more and 35 or less | Fe—Si | 3 | ≤7.0 × 10$^7$ | 30 |
| Coating-27 | Polyester/ melamine resin | More than 35 and 60 or less | VB2 | 3.1 | ≤7.0 × 10$^7$ | 30 |

Each of the produced coating application liquids was applied with a blade coater only to a single surface of the metal sheet cut to a size necessary for evaluation, partially applied only to a portion to which the CFRP was stuck, and dried and cured under conditions under which the temperature reached became 230° C. in 60 seconds. The partial application was carried out by masking portions other than the portion to which the CFRP was stuck with masking tape ("NITOFLON® tape" manufactured by Nitto Denko Corporation was used) in advance, then, applying the resin coating layer, drying and baking the resin coating layer, and then peeling the masking tape.

The thickness of each coating layer was obtained by observing a vertical cross section with a microscope using a sample that was embedded in a resin and polished in advance to make the vertical cross section observable and measuring the thickness of the coating layer.

(Thermal Compression Step)

A reinforcing fiber base material made of a carbon fiber (cloth material: manufactured by Toho Tenax Co., Ltd., IMS60) was painted with a powder having an average particle size D50 of 80 μm obtained by pulverizing and classifying a bisphenol A-type phenoxy resin "PHENO-TOTO YP-50S" manufactured by Nippon Steel & Sumikin Chemical Co., Ltd. (Mw=40,000, hydroxyl equivalent=284 g/eq., melt viscosity at 250° C.=90 Pa·s, and Tg=83° C.) in an electrostatic field under conditions of a charge of 70 kV and a blown air pressure of 0.32 MPa. After that, the powder was heated and melted in an oven at 170° C. for one minute to thermally fuse the resin, thereby producing a phenoxy resin CFRP pre-preg having a thickness of 0.65 mm, an elastic modulus of 75 [GPa], a tensile load of 13500[N], and a fiber volume content rate (Vf) of 60%. The size of the pre-preg was set to be the same as the size of the metal sheet.

In addition, a reinforcing fiber base material made of a carbon fiber (cloth material: manufactured by Toho Tenax Co., Ltd., IMS60) was painted with a powder having an average particle size D50 of 80 μm obtained by pulverizing and classifying Nylon 6 of a reagent in an electrostatic field under conditions of a charge of 70 kV and a blown air pressure of 0.32 MPa. After that, the powder was heated and melted in an oven at 170° C. for one minute to thermally fuse the resin, thereby producing a nylon CFRP pre-preg having a thickness of 0.65 mm and a fiber volume content rate (Vf) of 60%. The size of the pre-preg was set to be the same as the size of the metal sheet.

As the average particle size of the pulverized and classified phenoxy resin, the particle size was measured with a laser diffraction and scattering-type particle size distribution measuring instrument (MICROTRAC MT3300EX, manufactured by Nikkiso Co., Ltd.) when the cumulative volume reached 50% in terms of the volume.

Next, the produced pre-pregs were overlaid on the metal sheets on which the resin coating layer had been laminated and pressed at 3 MPa for three minutes with a press machine having a flat mold heated to 250° C., thereby producing metal-CFRP composites as composite samples as shown in Tables 2 and 3.

<Evaluation>

1. Electrodeposition Coatability

Using the produced composite samples having a width of 70 mm and a length of 150 mm, degreasing, surface adjustment, and a zinc phosphate treatment were carried out, and then electrodeposition coating was carried out. The composite samples were degreased by immersing the samples for five minutes at a temperature of 60° C. using a degreasing agent "FINE CLEANER E6408" manufactured by Nihon Parkerizing Co., Ltd. The surfaces of the degreased composite samples were adjusted by immersing the degreased samples for five minutes at a temperature of 40° C. using "PREPALENE X" manufactured by Nihon Parkerizing Co., Ltd. After that, the composite samples were immersed for three minutes at a temperature of 35° C. using a zinc phosphate chemical conversion agent "PALBOND L3065" manufactured by Nihon Parkerizing Co., Ltd., thereby carrying out the zinc phosphate treatment. After the zinc phosphate treatment, the composite samples were washed with water and dried in an oven with a 150° C. atmosphere. After that, an electrodeposition paint "POWER FLOAT 1200" manufactured by Nippon Paint Industrial Coating Co., Ltd. was electrodeposited to coat the composite samples under conditions under which a covering became 15 μm at the time of coating the metal sheet that was used in each level sample in a non-treated state (a state where the resin coating layer, the CFRP layer, or the chemical conversion layer was not provided) and baked for 20 minutes in an oven having a 170° C. atmosphere. The final products were used as samples. The electrodeposition coating was carried out to coat only a metal portion to which the CFRP was not stuck.

The CFRP states of the produced samples were visually observed, and whether or not the samples were coated by electrodeposition was evaluated.

2. Corrosion Resistance

A cycle corrosion test (CCT) was carried out using the produced samples. The mode of the CCT was in accordance with Japanese Automobile Standards Organization JASO-M609. The evaluation surfaces were the CFRP side of the samples, and the test was carried out with the samples installed in a tester such that saline water was sprayed to the evaluation surfaces.

In the test, the sample appearance was visually observed every 15 cycles (one cycle every eight hours), and the cycle in which red rust was generated was obtained. As the number of cycles carried out until the red rust was generated increases, the corrosion resistance becomes superior. In addition, since red rust is generated from near the end of the CFRP stuck to the metal, the observation was carried out with attention paid to such a fact. In a case where the metal sheet used was an aluminum alloy sheet or a magnesium alloy sheet, since red rust, which is an oxide of iron, was not generated, the number of cycles carried out until white rust, which is an oxide of aluminum or magnesium, was generated was obtained.

The corrosion resistance varies with the metal sheets used. Therefore, the corrosion resistance was evaluated with standards that vary with the kinds of the steel sheets. Specifically, in the case of using the cold-rolled steel sheet (CR), the sample was evaluated as a failed product when red rust was generated after no more than 30 cycles and evaluated as a passed product otherwise, in the case of using the plated steel sheet (GI), the sample was evaluated as a failed product when red rust was generated after no more than 60 cycles and evaluated as a passed product otherwise, in the case of using the plated steel sheet (GA), the sample was evaluated as a failed product when red rust was generated after no more than 60 cycles and evaluated as a passed product otherwise, in the case of using the plated steel sheet (Zn—Al—Mg), the sample was evaluated as a failed product when red rust was generated after no more than 120 cycles and evaluated as a passed product otherwise, in the case of using the plated steel sheet (Zn—Al—Mg—Si), the sample was evaluated as a failed product when red rust was generated after no more than 120 cycles and evaluated as a passed product otherwise, in the case of using the aluminum alloy sheet (Al sheet), the sample was evaluated as a failed product when white rust was generated after no more than 120 cycles and evaluated as a passed product otherwise, and, in the case of using the magnesium alloy sheet (Mg alloy sheet), the sample was evaluated as a failed product when white rust was generated after no more than 120 cycles and evaluated as a passed product otherwise.

3. Three-Point Bending Test

A three-point bending test was carried out using composite samples having a width of 30 mm and a length of 100 mm. As the present samples, composites having a CFRP stuck to the entire surface of the metal sheet on a single side were used. The sample was placed on a jig in which the distance between fulcrums was 60 mm, and a load was applied to the center between the fulcrums, thereby carrying out the three-point bending test. The sample was installed in the jig such that the load was applied to the CFRP side, and the test was carried out. When the sample was bent due to the load applied in the three-point bending test, the detachment state between the metal sheet and the CFRP was observed and evaluated. In a case where detachment occurred when the sample was bent 1.0 mm or less, the detachment state was evaluated as "D", in a case where detachment occurred when the sample was bent more than 1.0 mm and 3.0 mm or less, the detachment state was evaluated as "C", in a case where detachment occurred when the sample was bent more than 3.0 mm and 5.0 mm or less, the detachment state was evaluated as "B", and, in a case where detachment occurred when the sample was bent more than 5.0 mm, the detachment state was evaluated as "A".

4. Press Processability

The press processability during hot processing with a V-shaped uneven mold heated to 200° C. was tested using composite samples having a width of 50 mm and a length of 50 mm. As the present samples, composites having a CFRP stuck to the entire surface of the metal sheet on a single side were used, the mold was installed such that the recessed mold faced the CFRP and the protrusion mold faced the metal material, and the samples were pressed. The samples were pressed using molds in which the angle of the V portion in the V-shaped mold was 90° but the curvature radius (R) of the bent portion varied, and the limit R at which the CFRP was not detached was obtained. As the curvature radius R at which detachment does not occur decreases, the press formability becomes superior.

5. Coating Uniformity of Electrodeposition-Coated Coating

For the electrodeposition-coated samples, the vertical cross sections on the resin coating layer, on the CFRP layer, and on the CFRP end surface were observed with an optical microscope, and the film thicknesses of the electrodeposition-coated coating were evaluated. As the film thickness of the electrodeposition-coated coating, the film thicknesses were measured at three arbitrary visual fields, and the average value thereof was obtained. In a case where the film thickness of the electrodeposition-coated coating on the coating layer was 10 μm or more, the coating uniformity was evaluated as "A", in a case where the film thickness was 5 μm or more and less than 10 μm, the coating uniformity was evaluated as "B", in a case where the film thickness was 2 μm or more and less than 5 μm, the coating uniformity was evaluated as "C", in a case where the film thickness was 1 μm or more and less than 2 μm, the coating uniformity was evaluated as "D", and, in a case where the film thickness was less than 1 μm, the coating uniformity was evaluated as "E". In addition, samples evaluated as "A" to "D" were regarded as passed products, and samples evaluated as "E" were regarded as failed products The results of the above-described evaluations are shown in Tables 2 to 4 together with the configurations of the composite samples.

TABLE 2

| | | Composite | | | | | | Evaluation | | | | | |
| | | Resin coating layer | | | | CFRP | | Corrosion resistance (number of cycles until generation of red rust or white rust) | Electrodeposition coatability | Three-point bending test (detachment state) | Press processability | Coating uniformity | | | |
| No. | Metal sheet | Chemical conversion treatment | Kind | Film thickness: T (μm) | T/r (film thickness/ particle size) | Matrix resin | Film thickness (mm) | | | | | End surface | On CFRP | On resin coating layer | Note |
|---|---|---|---|---|---|---|---|---|---|---|---|---|---|---|---|
| 1 | CR | Si-based | Coating-1 | 20 | 6.5 | Phenoxy | 1.5 | 120 | CFRP portion also coated | C | >25 mmR | A | A | A | Present Invention Example |
| 2 | GA | Si-based | Coating-1 | 20 | 6.5 | Phenoxy | 1.5 | 165 | CFRP portion also coated | C | >25 mmR | A | A | A | Present Invention Example |
| 3 | GA | Si-based | Coating-2 | 20 | 6.5 | Phenoxy | 1.5 | 90 | CFRP portion also coated | A | ≥20 mmR | C | C | B | Present Invention Example |
| 4 | GA | Si-based | Coating-3 | 20 | 6.5 | Phenoxy | 1.5 | 120 | CFRP portion also coated | A | ≥20 mmR | A | A | A | Present Invention Example |
| 5 | GA | Si-based | Coating-4 | 20 | 6.5 | Phenoxy | 1.5 | 165 | CFRP portion also coated | A | ≥20 mmR | A | A | A | Present Invention Example |

TABLE 2-continued

| | | | Composite | | | Evaluation | | | | | | | |
|---|---|---|---|---|---|---|---|---|---|---|---|---|---|
| | | | Resin coating layer | | | | Corrosion resistance | | Three-point bending | | | Coating uniformity | | |
| No. | Metal sheet | Chemical conversion treatment | Kind | Film thick-ness: T (μm) | T/r (film thick-ness/ particle size) | CFRP Matrix resin | CFRP Film thick-ness (mm) | (number of cycles until generation of red rust or white rust) | Electro-deposition coat-ability | bending test (detach-ment state) | Press process-ability | End surface | On CFRP | On resin coating layer | Note |
| 6 | GA | Si-based | Coating-4 | 5 | 1.6 | Phenoxy | 1.5 | 90 | CFRP portion also coated | A | ≥20 mmR | A | A | A | Present Invention Example |
| 7 | GA | Si-based | Coating-4 | 10 | 3.2 | Phenoxy | 1.5 | 120 | CFRP portion also coated | A | ≥20 mmR | A | A | A | Present Invention Example |
| 8 | GA | Si-based | Coating-4 | 50 | 16.1 | Phenoxy | 1.5 | 150 | CFRP portion also coated | A | ≥20 mmR | B | B | A | Present Invention Example |
| 9 | GA | Si-based | Coating-4 | 200 | 64.5 | Phenoxy | 1.5 | 165 | CFRP portion also coated | C | ≥20 mmR | C | C | B | Present Invention Example |
| 10 | GA | Si-based | Coating-5 | 20 | 6.5 | Phenoxy | 1.5 | 120 | CFRP portion also coated | D | ≥20 mmR | A | A | A | Present Invention Example |
| 11 | GA | Si-based | Coating-6 | 20 | 400 to 2000 | Phenoxy | 1.5 | 90 | CFRP portion also coated | A | ≥20 mmR | D | D | C | Present Invention Example |
| 12 | GA | Si-based | Coating-7 | 20 | 2 | Phenoxy | 1.5 | 90 | CFRP portion also coated | A | ≥20 mmR | A | A | A | Present Invention Example |
| 13 | GA | Si-based | Coating-8 | 20 | 6.7 | Phenoxy | 1.5 | 165 | CFRP portion also coated | A | ≥20 mmR | A | A | A | Present Invention Example |
| 14 | GA | Si-based | Coating-9 | 20 | 2.2 | Phenoxy | 1.5 | 165 | CFRP portion also coated | A | ≥20 mmR | A | A | A | Present Invention Example |
| 15 | GA | Si-based | Coating-10 | 200 | 4.3 | Phenoxy | 1.5 | 105 | CFRP portion also coated | C | ≥20 mmR | C | C | B | Present Invention Example |
| 16 | GA | Si-based | Coating-11 | 200 | 2.0 | Phenoxy | 1.5 | 90 | CFRP portion also coated | C | ≥20 mmR | C | C | B | Present Invention Example |
| 17 | GA | Si-based | Coating-12 | 20 | 10 | Phenoxy | 1.5 | 150 | CFRP portion also coated | A | ≥20 mmR | A | A | A | Present Invention Example |

TABLE 3

| No. | Metal sheet | Composite — Chemical conversion treatment | Resin coating layer — Kind | Film thickness: T (μm) | T/r (film thickness/particle size) | CFRP Matrix resin | CFRP Film thickness (mm) | Corrosion resistance (number of cycles until generation of red rust or white rust) | Electro-deposition coatability | Three-point bending test (detachment state) | Press processability | Coating uniformity End surface | Coating uniformity On CFRP | Coating uniformity On resin coating layer | Note |
|---|---|---|---|---|---|---|---|---|---|---|---|---|---|---|---|
| 18 | GA | Si-based | Coating-12 | 500 | 250 | Phenoxy | 1.5 | 165 | CFRP portion also coated | D | ≥20 mmR | C | C | B | Present Invention Example |
| 19 | GA | Si-based | Coating-13 | 20 | 5.7 | Phenoxy | 1.5 | 165 | CFRP portion also coated | A | ≥20 mmR | A | A | A | Present Invention Example |
| 20 | GA | Si-based | Coating-14 | 20 | 4 | Phenoxy | 1.5 | 165 | CFRP portion also coated | A | ≥20 mmR | A | A | A | Present Invention Example |
| 21 | GA | Si-based | Coating-15 | 20 | 10 | Phenoxy | 1.5 | 165 | CFRP portion also coated | A | ≥20 mmR | A | A | A | Present Invention Example |
| 22 | GA | Cr-based | Coating-4 | 20 | 6.5 | Phenoxy | 1.5 | 165 | CFRP portion also coated | A | ≥20 mmR | A | A | A | Present Invention Example |
| 23 | GA | Zr-based | Coating-4 | 20 | 6.5 | Phenoxy | 1.5 | 165 | CFRP portion also coated | A | ≥20 mmR | A | A | A | Present Invention Example |
| 24 | GI | Si-based | Coating-4 | 20 | 6.5 | Phenoxy | 1.5 | 150 | CFRP portion also coated | A | ≥20 mmR | A | A | A | Present Invention Example |
| 25 | Zn—Al—Mg | Si-based | Coating-4 | 20 | 6.5 | Phenoxy | 1.5 | 165 | CFRP portion also coated | A | ≥20 mmR | A | A | A | Present Invention Example |
| 26 | Zn—Al—Mg—Si | Si-based | Coating-4 | 20 | 6.5 | Phenoxy | 1.5 | 180 | CFRP portion also coated | A | ≥20 mmR | A | A | A | Present Invention Example |
| 27 | Al sheet | Si-based | Coating-4 | 20 | 6.5 | Phenoxy | 1.5 | >180 | CFRP portion also coated | A | ≥20 mmR | A | A | A | Present Invention Example |
| 28 | Mg alloy sheet | Si-based | Coating-4 | 20 | 6.5 | Phenoxy | 1.5 | >180 | CFRP portion also coated | A | ≥20 mmR | A | A | A | Present Invention Example |
| 29 | GA | Si-based | Coating-21 | 20 | 6.5 | Phenoxy | 1.5 | 165 | CFRP portion also coated | A | ≥10 mmR | A | A | A | Present Invention Example |

TABLE 3-continued

| | | Composite | | | | | | Evaluation | | | | | | |
|---|---|---|---|---|---|---|---|---|---|---|---|---|---|---|
| | | | Resin coating layer | | | | | Corrosion resistance (number of cycles until generation of red rust or white rust) | Electro- deposition coat- ability | Three- point bending test (detach- ment state) | Press process- ability | Coating uniformity | | |
| No. | Metal sheet | Chem- ical con- version treat- ment | Kind | Film thick- ness: T (μm) | T/r (film thick- ness/ particle size) | CFRP Matrix resin | Film thick- ness (mm) | | | | | End sur- face | On CFRP | On resin coat- ing layer | Note |
| 30 | GA | Si- based | Coating- 22 | 20 | 6.5 | Phen- oxy | 1.5 | 165 | CFRP portion also coated | B | ≥5 mmR | A | A | A | Present Inven- tion Exam- ple |
| 31 | GA | Si- based | Coating- 23 | 20 | 5.7 | Phen- oxy | 1.5 | 120 | CFRP portion also coated | B | ≥5 mmR | A | A | A | Present Inven- tion Exam- ple |
| 32 | GA | Si- based | Coating- 25 | 20 | 6.5 | Phen- oxy | 1.5 | 165 | CFRP portion also coated | A | ≥20 mmR | A | A | A | Present Inven- tion Exam- ple |
| 33 | GA | Si- based | Coating- 26 | 20 | 6.7 | Phen- oxy | 1.5 | 165 | CFRP portion also coated | A | ≥20 mmR | A | A | A | Present Inven- tion Exam- ple |
| 34 | GA | Si- based | Coating- 4 | 20 | 6.5 | Nylon | 1.5 | >180 | CFRP portion also coated | C | ≥10 mmR | A | A | A | Present Inven- tion Exam- ple |

TABLE 4

| | | Composite | | | | | | Evaluation | | | | | | |
|---|---|---|---|---|---|---|---|---|---|---|---|---|---|---|
| | | | Resin coating layer | | | | | Corrosion resistance (number of cycles until generation of red rust or white rust) | Electro- deposition coat- ability | Three- point bending test (detach- ment state) | Press process- ability | Coating uniformity | | |
| No. | Metal sheet | Chem- ical con- version treat- ment | Kind | Film thick- ness: T (μm) | T/r (film thick- ness/ particle size) | CFRP Matrix resin | Film thick- ness (mm) | | | | | End sur- face | On CFRP | On resin coat- ing layer | Note |
| 35 | CR | No | No | — | — | Phenoxy | 1.5 | 30 | CFRP portion also coated | C | ≥5 mmR | A | A | A | Com- par- ative Exam- ple |
| 36 | GA | No | No | — | — | Phenoxy | 1.5 | 45 | CFRP portion also coated | C | ≥5 mmR | A | A | A | Com- par- ative Exam- ple |
| 37 | GI | No | No | — | — | Phenoxy | 1.5 | 45 | CFRP portion also coated | C | ≥5 mmR | A | A | A | Com- par- ative Exam- ple |

TABLE 4-continued

| | | Composite | | | | | Evaluation | | | | | | |
|---|---|---|---|---|---|---|---|---|---|---|---|---|---|
| | | | Resin coating layer | | | | Corrosion resistance (number of cycles until generation of red rust or white rust) | | Three-point bending test (detachment state) | | Coating uniformity | | |
| No. | Metal sheet | Chemical conversion treatment | Kind | Film thickness: T (μm) | T/r (film thickness/ particle size) | CFRP Matrix resin | CFRP Film thickness (mm) | | Electrodeposition coatability | | Press processability | End surface | On CFRP | On resin coating layer | Note |
| 38 | Zn—Al—Mg | No | No | — | — | Phenoxy | 1.5 | 60 | CFRP portion also coated | C | ≥5 mmR | A | A | A | Comparative Example |
| 39 | Zn—Al—Mg—Si | No | No | — | — | Phenoxy | 1.5 | 75 | CFRP portion also coated | C | ≥5 mmR | A | A | A | Comparative Example |
| 40 | CR | Si-based | Coating-20 | 20 | — | Phenoxy | 1.5 | 30 | CFRP portion also coated | A | ≥20 mmR | E | E | E | Comparative Example |
| 41 | GA | Si-based | Coating-20 | 20 | — | Phenoxy | 1.5 | 60 | CFRP portion also coated | A | ≥20 mmR | E | E | E | Comparative Example |
| 42 | GI | Si-based | Coating-20 | 20 | — | Phenoxy | 1.5 | 60 | CFRP portion also coated | A | ≥20 mmR | E | E | E | Comparative Example |
| 43 | Zn—Al—Mg | Si-based | Coating-20 | 20 | — | Phenoxy | 1.5 | 90 | CFRP portion also coated | A | ≥20 mmR | E | E | E | Comparative Example |
| 44 | Zn—Al—Mg—Si | Si-based | Coating-20 | 20 | — | Phenoxy | 1.5 | 120 | CFRP portion also coated | A | ≥20 mmR | E | E | E | Comparative Example |
| 45 | GA | Si-based | Coating-16 | 20 | 4 | Phenoxy | 1.5 | 60 | CFRP portion also coated | A | ≥20 mmR | A | A | A | Comparative Example |
| 46 | GA | Si-based | Coating-17 | 20 | 0 | Phenoxy | 1.5 | 60 | CFRP portion also coated | A | ≥20 mmR | C | C | B | Comparative Example |
| 47 | GA | Si-based | Coating-18 | 20 | 71.4 | Phenoxy | 1.5 | 60 | CFRP portion also coated | A | ≥20 mmR | E | E | E | Comparative Example |
| 48 | GA | Si-based | Coating-19 | 20 | 0 | Phenoxy | 1.5 | 60 | CFRP portion also coated | A | ≥20 mmR | E | E | E | Comparative Example |
| 49 | GA | Si-based | Coating-24 | 20 | 4.3 | Phenoxy | 1.5 | 60 | CFRP portion also coated | B | ≥5 mmR | E | E | E | Comparative Example |

TABLE 4-continued

| | | | Composite | | | | | | Evaluation | | | | | | |
|---|---|---|---|---|---|---|---|---|---|---|---|---|---|---|---|
| | | | Resin coating layer | | | | | Corrosion resistance (number of cycles until generation of red rust or white rust) | Electro-deposition coatability | Three-point bending test (detachment state) | Press process-ability | Coating uniformity | | | |
| No. | Metal sheet | Chemical conversion treatment | Kind | Film thickness: T (μm) | T/r (film thickness/particle size) | CFRP Matrix resin | CFRP Film thickness (mm) | | | | | End surface | On CFRP | On resin coating layer | Note |
| 50 | GA | Si-based | Coating-30 | 20 | 6.5 | Phenoxy | 1.5 | 165 | CFRP portion also coated | A | ≥20 mmR | A | A | A | Present Invention Example |

The present results show that, in a case where the same kind of metal sheet was used, the metal-CFRP composites of the invention of the present application were excellent in terms of corrosion resistance to galvanic corrosion of dissimilar materials between the carbon fiber and the metal and were also excellent in terms of the electrodeposition coatability in the CFRP portion.

Hitherto, the preferable embodiments of the present invention have been described in detail with reference to the accompanying drawings, but the present invention is not limited to such examples. It is evident that a person skilled in the art of the present invention is able to consider a variety of modification examples or correction examples within the scope of the technical concept described in the claims, and it is needless to say that such examples are understood to be in the technical scope of the present invention.

BRIEF DESCRIPTION OF THE REFERENCE SYMBOLS 1, 1A, 1B, 1C, 1D, 1E, 1F, 1G, 1H Metal-CFRP composite
11, 11A, 11B Metal member
12, 12A, 12B, 12C CFRP layer
121 Carbon fiber material
123 Matrix resin
13, 13A, 13B Resin coating layer
131 Conductive particle
133 Binder resin
14 Chemical conversion layer
15 Electrodeposition-coated coating

The invention claimed is:

1. A metal-carbon fiber reinforced resin material composite comprising:
a metal member;
a resin coating layer disposed on at least a part of a surface of the metal member; and
a carbon fiber reinforced resin material that is disposed on at least a part of a surface of the resin coating layer and contains a matrix resin and a carbon fiber material present in the matrix resin,
wherein the resin coating layer contains one or a plurality of kinds of conductive particles selected from metal particles, intermetallic compound particles, conductive oxide particles, and conductive non-oxide ceramic particles and further contains a binder resin,
the conductive particles have a powder resistivity at 23° C. to 27° C. of $7.0 \times 10^7$ Ω·cm or less and contain one or more selected from the group including Zn, Si, Zr, V, Cr, Mo, Mn, and W as a configuration element, and
wherein at least one kind of said conductive particles is selected from one or more of Al-doped zinc oxide, $ZrB_2$, $MoSi_2$, $CrB_2$, $WSi_2$, $VB_2$, ferrosilicon, and ferromanganese.

2. The metal-carbon fiber reinforced resin material composite according to claim 1, wherein the conductive oxide particles are doped conductive oxide particles.

3. The metal-carbon fiber reinforced resin material composite according to claim 1,
wherein a volume rate of the conductive particles in the resin coating layer is 1.0% or more and 30.0% or less.

4. The metal-carbon fiber reinforced resin material composite according to claim 1,
wherein an average thickness of the resin coating layer is 1.0 μm or more and 200.0 μm or less.

5. The metal-carbon fiber reinforced resin material composite according to claim 1,
wherein an average particle size of the conductive particles is 50.0 μm or less.

6. The metal-carbon fiber reinforced resin material composite according to claim 1,
wherein, when an average thickness of the resin coating layer is represented by T (μm) and an average particle size of the conductive particles is represented by r (μm), a relationship of $0.5 \leq T/r \leq 300.0$ is satisfied.

7. The metal-carbon fiber reinforced resin material composite according to claim 1,
wherein a glass transition temperature of the resin coating layer is 100° C. or lower.

8. The metal-carbon fiber reinforced resin material composite according to claim 1,
wherein the binder resin is an epoxy resin or a resin containing one or more kinds selected from the group including a urethane resin, an epoxy resin, a polyester resin, and a melamine resin and an epoxy resin.

9. The metal-carbon fiber reinforced resin material composite according to claim 1,
wherein the matrix resin contains a thermoplastic resin.

10. The metal-carbon fiber reinforced resin material composite according to claim 1,
wherein the matrix resin contains a phenoxy resin.

11. The metal-carbon fiber reinforced resin material composite according to claim 1, further comprising:
an electrodeposition-coated coating formed on at least one selected from the group of the resin coating layer and the carbon fiber reinforced resin material.

12. The metal-carbon fiber reinforced resin material composite according to claim 1,
wherein the metal member is steel or plated steel.

13. A method for manufacturing a metal-carbon fiber reinforced resin material composite comprising:
a step of thermally compressing a metal member provided on at least a part of a surface of a resin coating layer containing conductive particles and a binder resin and a carbon fiber reinforced resin material through the resin coating layer,
wherein the conductive particles contain one or a plurality of kinds of metal particles, intermetallic compound particles, conductive oxide particles, and conductive non-oxide ceramic particles,
the conductive particles have a powder resistivity at 23° C. to 27° C. of $7.0 \times 10^7$ $\Omega \cdot cm$ or less and contain one or more selected from the group including Zn, Si, Zr, V, Cr, Mo, Mn, and W as a configuration element, and
wherein at least one kind of said conductive particles is selected from one or more of Al-doped zinc oxide, ZrBz, MoSi, CrBz, WSi, VB, ferrosilicon, and ferromanganese.

14. The method for manufacturing a metal-carbon fiber reinforced resin material composite according to claim 13, the method further comprising, before the step of thermal compression:
a step of forming the metal member.

15. The method for manufacturing a metal-carbon fiber reinforced resin material composite according to claim 13, the method further comprising, after the step of thermal compression:
a step of forming a laminate in which the metal member and the carbon fiber reinforced resin material are laminated together.

16. The method for manufacturing a metal-carbon fiber reinforced resin material composite according to claim 13, the method further comprising:
a step of forming an electrodeposition-coated coating on at least one selected from the group of the resin coating layer and on the carbon fiber reinforced resin material by electrodeposition coating.

17. The metal-carbon fiber reinforced resin material composite according to claim 2,
wherein a volume rate of the conductive particles in the resin coating layer is 1.0% or more and 30.0% or less.

* * * * *